(12) United States Patent
Kiani et al.

(10) Patent No.: US 6,839,935 B2
(45) Date of Patent: Jan. 11, 2005

(54) METHODS AND APPARATUS FOR CLEANING OPTICAL CONNECTORS

(75) Inventors: Sepehr Kiani, Watertown, MA (US); Chung Yi Chou, Nashua, NH (US); David Jacob Gessel, Oakland, CA (US); Richard F. Roth, Brookline, NH (US); John A. Lehman, Bedford, NH (US)

(73) Assignee: Teradyne, Inc., Boston, MA (US)

( * ) Notice: Subject to any disclaimer, the term of this patent is extended or adjusted under 35 U.S.C. 154(b) by 426 days.

(21) Appl. No.: 10/156,905

(22) Filed: May 29, 2002

(65) Prior Publication Data

US 2003/0221706 A1 Dec. 4, 2003

(51) Int. Cl.[7] .............................. G02B 6/36; B08B 3/02; B08B 3/10; B08B 3/12; B08B 11/00
(52) U.S. Cl. ........................... 15/345; 15/210.1; 15/304
(58) Field of Search ......................... 15/301, 302, 304, 15/310, 345, 346, 405, 406, 209.1, 210.1

(56) References Cited

U.S. PATENT DOCUMENTS

| | | | |
|---|---|---|---|
| 3,209,301 A | 9/1965 | Duffy, Jr. ...................... 339/22 |
| 4,088,386 A | 5/1978 | Hawk ...................... 350/96.21 |
| 4,158,476 A | 6/1979 | McCartney ............. 350/96.21 |
| 4,258,977 A | 3/1981 | Lukas et al. ............. 350/96.21 |
| 4,277,135 A | 7/1981 | Schrott et al. ........... 350/96.21 |
| 4,436,366 A | 3/1984 | Abramson ................. 350/96.2 |
| 4,456,351 A | 6/1984 | Hiramatsu et al. .......... 354/402 |
| 4,469,398 A | 9/1984 | De Baets et al. .......... 350/96.2 |
| 4,613,105 A | 9/1986 | Genequand et al. ........ 248/178 |
| 4,733,428 A | 3/1988 | Malinge et al. ............... 15/302 |
| 4,787,706 A | 11/1988 | Cannon et al. ............ 350/96.2 |
| 4,904,036 A | 2/1990 | Blonder .................... 350/96.11 |
| 5,073,000 A | 12/1991 | Derfiny ....................... 385/14 |
| 5,082,344 A | 1/1992 | Mulholland et al. .......... 385/60 |
| 5,121,454 A | 6/1992 | Iwano et al. ................... 385/60 |
| 5,123,073 A | 6/1992 | Pimpinella .................... 385/59 |
| 5,144,611 A | 9/1992 | Engler et al. ................. 369/71 |
| 5,204,925 A | 4/1993 | Bonanni et al. .............. 385/89 |
| 5,220,703 A | 6/1993 | Kanayama et al. ........ 15/210.1 |
| 5,257,332 A | 10/1993 | Pimpinella .................... 385/59 |
| 5,283,851 A | 2/1994 | Vergnolle ................... 385/134 |
| 5,337,396 A | 8/1994 | Chen et al. .................... 385/92 |

(List continued on next page.)

FOREIGN PATENT DOCUMENTS

| | | | |
|---|---|---|---|
| DE | 199 26 084 A 1 | 12/2000 | ........... B08B/15/00 |
| EP | 60256103 | * 12/1985 | |
| EP | 0 813 083 A1 | 12/1997 | |

(List continued on next page.)

OTHER PUBLICATIONS

European Patent Office; Patent Abstracts of Japan; Publication No. 2002031739; Publication Date: Jan. 31, 2002; Application No.: 2000215365; Applicant: NTT Advanced Technology Corp.; 1 Page.

(List continued on next page.)

*Primary Examiner*—Terrence R. Till
(74) *Attorney, Agent, or Firm*—David E. Huang, Esq.

(57) ABSTRACT

A system cleans a set of optical connectors. The system includes a fluid source, a vacuum source, a support member which defines a cleaning device edge, and a set of cleaning devices. Each cleaning device includes (i) a fluid intake member which connects to the fluid source, (ii) a fluid output member which connects to the vacuum source, and (iii) a cleaning head which connects to the fluid intake member and the fluid output member. Each cleaning device is disposed along the cleaning device edge of the support member. The set of cleaning devices is configured to (a) align over a set of optical interfaces of the set of optical connectors, (b) direct fluid (e.g., gas, gaseous snow, etc.) from the fluid source toward the set of optical interfaces, and (c) draw the directed fluid away from the set of optical interfaces and toward the vacuum source.

20 Claims, 10 Drawing Sheets

U.S. PATENT DOCUMENTS

| | | | | |
|---|---|---|---|---|
| 5,348,487 | A | | 9/1994 | Marazzi et al. ............. 439/138 |
| 5,379,362 | A | | 1/1995 | Kawamura .................. 385/92 |
| 5,394,503 | A | | 2/1995 | Dietz, Jr. et al. ........... 385/135 |
| 5,425,831 | A | | 6/1995 | Grimes et al. .............. 156/179 |
| 5,513,293 | A | | 4/1996 | Holland et al. ............. 385/134 |
| 5,598,494 | A | | 1/1997 | Behrmann et al. ............ 385/59 |
| 5,598,495 | A | | 1/1997 | Rittle et al. ................... 385/75 |
| 5,725,154 | A | | 3/1998 | Jackson ...................... 239/135 |
| 5,768,738 | A | | 6/1998 | Lee ............................ 15/210.1 |
| 5,778,123 | A | | 7/1998 | Hagan et al. ................. 385/76 |
| 5,836,031 | A | * | 11/1998 | Cox ...................... 15/104.002 |
| 5,838,856 | A | | 11/1998 | Lee .............................. 385/54 |
| 5,845,028 | A | | 12/1998 | Smith et al. .................. 385/59 |
| 5,845,036 | A | | 12/1998 | DeMarchi ................... 385/139 |
| 5,920,670 | A | | 7/1999 | Lee et al. ..................... 385/78 |
| 5,940,560 | A | | 8/1999 | DeMarchi et al. ............ 385/58 |
| 6,005,991 | A | | 12/1999 | Knasel ......................... 385/14 |
| 6,041,652 | A | | 3/2000 | Stewart ................... 73/504.04 |
| 6,195,827 | B1 | | 3/2001 | Dumitriu .................... 15/1.51 |
| 6,205,700 | B1 | | 3/2001 | Rigby et al. ................... 43/79 |
| 6,209,163 | B1 | * | 4/2001 | Clairadin et al. ............ 15/97.1 |
| 6,233,376 | B1 | | 5/2001 | Updegrove .................. 385/14 |
| 6,259,840 | B1 | | 7/2001 | Munoz-Bustamante et al. .......................... 385/39 |
| 6,270,262 | B1 | | 8/2001 | Hudgins et al. .............. 385/88 |
| 6,296,398 | B1 | | 10/2001 | Lu ............................... 385/60 |
| 6,300,082 | B1 | | 10/2001 | Erb et al. ..................... 435/7.1 |
| 6,304,690 | B1 | | 10/2001 | Day ............................. 385/24 |
| 6,305,848 | B1 | | 10/2001 | Gregory ....................... 385/53 |
| 6,361,218 | B1 | | 3/2002 | Matasek et al. .............. 385/60 |
| 6,374,030 | B2 | * | 4/2002 | Krow et al. ................. 385/134 |
| 6,419,399 | B1 | | 7/2002 | Loder et al. .................. 385/53 |
| 6,449,795 | B1 | * | 9/2002 | Sato .......................... 15/210.1 |
| 2002/0006261 | A1 | | 1/2002 | Krow, Jr. et al. |
| 2002/0162582 | A1 | * | 11/2002 | Chu et al. .................... 134/105 |
| 2003/0098045 | A1 | * | 5/2003 | Loder et al. ................... 134/8 |
| 2003/0111094 | A1 | * | 6/2003 | Clatanoff et al. .............. 134/6 |
| 2003/0169992 | A1 | * | 9/2003 | Fujiwara et al. ............ 385/134 |

FOREIGN PATENT DOCUMENTS

| | | | | |
|---|---|---|---|---|
| EP | 1 048 963 A1 | | 11/2000 | |
| JP | 60-256103 | | 12/1985 | ............ G02B/6/24 |
| JP | 63-279207 | * | 11/1988 | |
| JP | 63-285961 | | 11/1988 | |
| JP | 10-74884 | | 3/1989 | |
| JP | 2-125210 | * | 5/1990 | |
| JP | 9-68623 | * | 3/1997 | |
| JP | 10-260335 | * | 9/1998 | |
| JP | 2000-249871 | | 9/2000 | |
| JP | 2001-188145 | * | 7/2001 | |
| JP | 2002-98858 | * | 4/2002 | |
| WO | WO 98/40769 | | 9/1998 | ............ G02B/6/00 |
| WO | WO 99/13367 | | 3/1999 | |

OTHER PUBLICATIONS

3M Utilities and Telecommunications: VOL–0570 VF–45™ Maintenance Cleaning Kit; http://products.3m.com/us/util_telecom/products/tsdvolition.jhtml?powurl=GSN8925771gs; Visited Site on Apr. 24, 2002; 2 Pages.

http://multimedia.mmm.com/mws/mediawebserver.dyn?666666Ozjcf6Ivs6Evs666tQ3c7rr; Visited Site on Apr. 24, 2002; 1 Page of Picture.

WO 98 35821 A (Soes Lucas; Blieck Roland Trsitan De (NL); Broeksteeg Johannes Mar) Aug. 20, 1998.

New York Institute of Photography; Tips for Better Photographs; http://www.nyip.com/sub_idx_pgs/referidx/camera_corner_0599.html; 4 pages.

WO 03 021320 (Teradyne Inc.) Mar. 13, 2003.

Molex, HBMT™ MT High Density Backplane Interconnect System, Mounting Style: Rivet or Screw, Housing: UL V–O.

Patent Abstract of Japan, Publication No. 2000249871, Publication Date: Sep. 14, 2000, 1 page.

Patent Abstract of Japan, Publication No. 60256103, Publication Date: Dec. 17, 1985, 1 page.

International Search Report from International Application No. PCT/US03/16113, 2 pages.

Patent Abstract of Japan, vol. 2000, No. 12, Jan. 3, 2001 & JP 2000 249871 A (Nippon Telegr & Teleph Corp.), Sep. 14, 2000.

Patent Abstract of Japan, vol. 1997, No. 08, Aug. 29, 1997 & JP 09 105835 A (Nippon Telegr & Amp;Teleph Corp & Lt; NTT & GT;), Apr. 22, 1997.

Patent Abstract of Japan, vol. 008, No. 098 (C–221), May 9, 1984 & JP 59 013641 A (Nippon Denshin Denwa Kosha; Others: 01), Jan. 24, 1984.

International Search Report from PCT/US03/16113 filing date May 22, 2003, date of actual completion of the international search Mar. 11, 2004, date of mailing of the international search report Mar. 22, 2004.

* cited by examiner

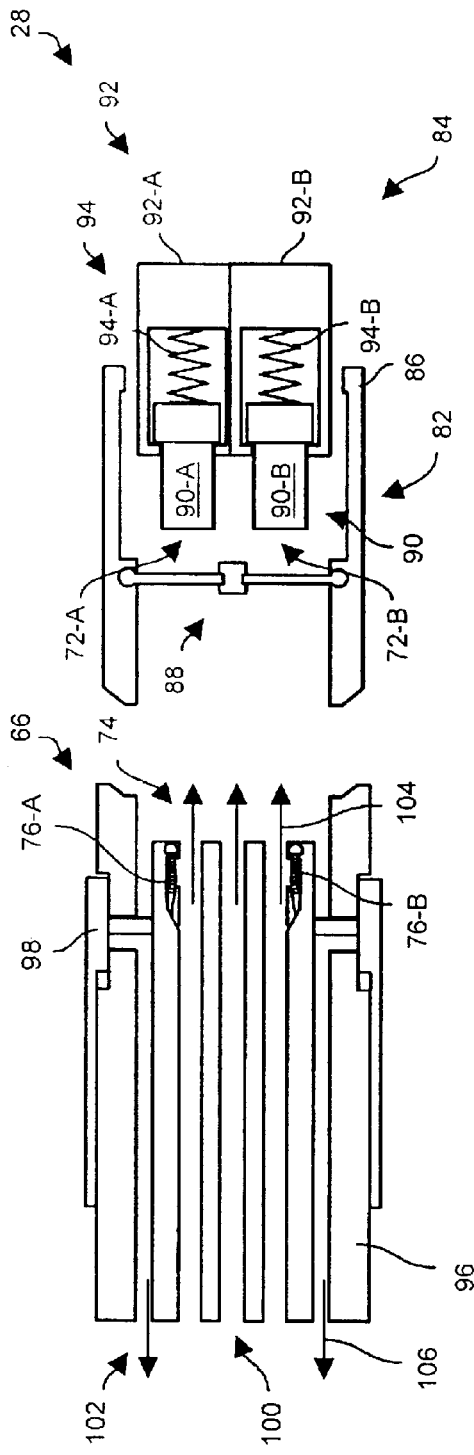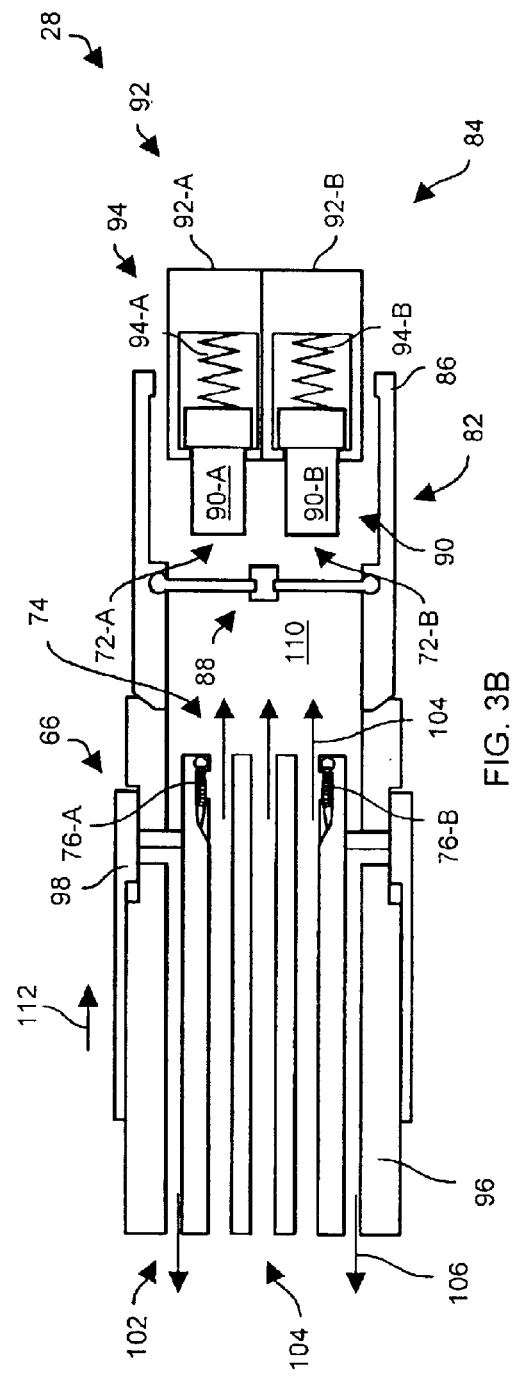

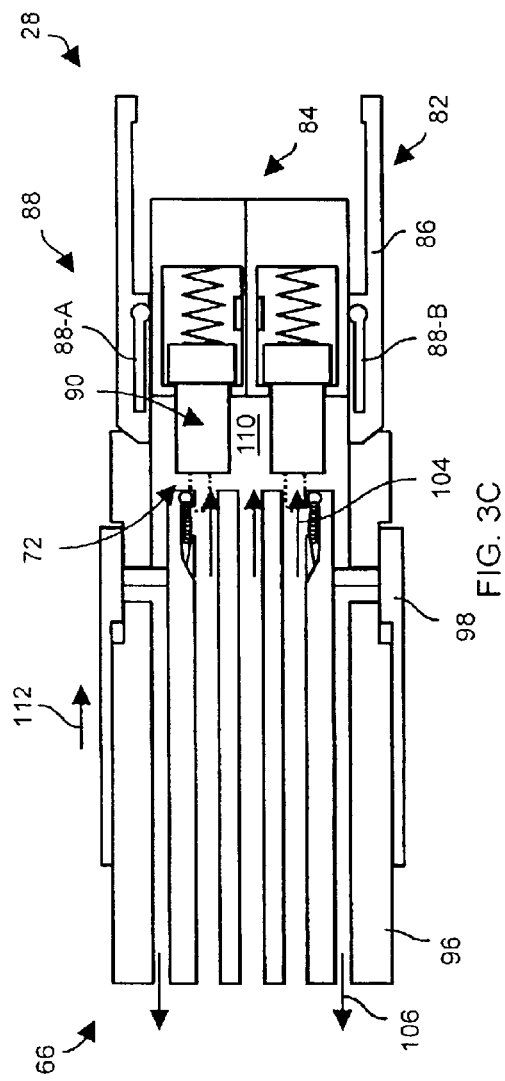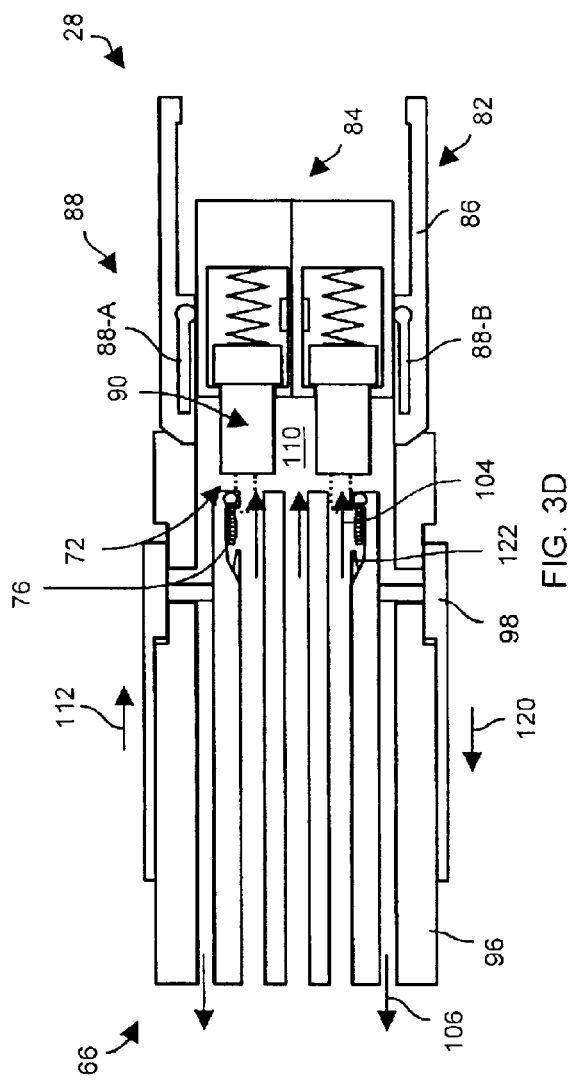

METHODS AND APPARATUS FOR CLEANING OPTICAL CONNECTORS

BACKGROUND OF THE INVENTION

A fiber optic component such as a fiber optic network cable or a fiber optic transducer module typically includes a fiber optic connector which is designed to connect with a corresponding fiber optic connector to provide a separable interface while minimizing additional optical losses. One type of fiber optic connector includes a ferrule (e.g., a precision-molded ceramic, metal, silicon, glass or plastic part) which holds a set of fiber ends (e.g., one end, four ends, eight ends, 12 ends, etc.). The manner in which the ferrule holds the set of fiber ends typically defines one of several standard optical interface formations (e.g., an MT ferrule which holds a 1×4 array of fiber ends, a 2×4 array, a 1×12 array, etc.).

When one fiber optic connector connects with another fiber optic connector, alignment structures of these optical connectors (e.g., guide pins or alignment sleeves) typically position the optical interfaces such that the fiber ends accurately align to form a set of fiber optic connections between the optical interfaces. Accordingly, during operation, pulses of light can pass through the set of fiber optic connections preserving the light and limiting any substantial light energy loss.

Clean optical interfaces are critical for high performance connectors. Cleaning is important because particulate matter, such as dust, has a similar size to the core of the optical fiber and if positioned at or near the fiber core, can block the light resulting in energy loss. In addition film-based contamination (e.g., finger oils) can result in attenuation of light energy. Some manufacturers of fiber optic equipment (e.g., fiber optic cable manufacturers, patch panel manufacturers, etc.) recommend cleaning optical interfaces whenever there is a disconnection and reconnection. For example, suppose that a user wishes to unplug a fiber optic cable end from a location on a patch panel and then plug that end into a new location on the patch panel. The user should clean the optical interface of the fiber optic cable end as well as the optical interface of the new patch panel location prior to plugging the fiber optic cable end into the new location.

There are a variety of conventional approaches to cleaning fiber optic connectors. One approach to cleaning fiber optic connectors (hereinafter referred to as the "pad application approach") involves the use of a pad having a sticky surface. In the pad application approach, a user attaches the pad to a small handheld tool, and then manually maneuvers the small handheld tool such that the sticky surface of the pad contacts the optical interface of the connector. The user then removes the sticky surface of the pad from the optical interface. Any dust or dirt that remained attached to the sticky surface of the pad is thus removed from the optical interface so that it no longer interferes with light transmission (e.g., so that it can no longer pose a threat to blocking light transfer from one fiber end to another, so that it will not scatter or block the light as it passes through the connection, etc.).

Another fiber optic connector cleaning approach (hereinafter referred to as the "tape application approach") involves the use of (i) a tape having an absorbent and textured surface for trapping particles, and (ii) a shuttered cartridge that keeps the tape clean and that advances a fresh, virgin segment of tape upon opening. During operation, the user wipes the connector against the fresh tape. After the user moves the tape away from the optical interface, any dirt that remains embedded in the surface of that tape portion is thus removed from the optical interface so that the dirt no longer interferes with light transmission.

Yet another fiber optic connector cleaning approach (hereinafter referred to as the "cleaning liquid approach") involves the use of a volatile liquid. In the cleaning liquid approach, the user deposits the volatile liquid over the optical interface of the optical connector to dissolve and carry away dirt from the optical interface. The liquid evaporates after a short period of time leaving the optical interface with a dry surface for connecting to an optical interface of another optical connector.

Another fiber optic connector cleaning approach (hereinafter referred to as the "cloth application approach") involves the use of a lint-free cloth. In this approach, the user manually wipes each optical interface individually with a portion of a lint-free cloth (or wipe) to remove dust particles from the optical interfaces. In some situations, the user applies liquid (e.g., alcohol) to the lint-free cloth prior to wiping off an optical interface.

SUMMARY OF THE INVENTION

Unfortunately, there are deficiencies to the above-described conventional approaches to cleaning a fiber optic connector. For example, the above-described conventional pad application approach requires the user to perform a significant amount of tedious handheld tool manipulation to attach a pad to the small handheld tool, to maneuver the small handheld tool such that the pad contacts an optical interface of an optical connector, and then to remove the pad from the small handheld tool in order to repeat the entire process for another optical interface. Furthermore, in at least some respects, the pad application approach is not well-suited for cleaning an optical connector having shutters since the shutters can inadvertently catch and dislodge the pad from the small handheld tool while the user cleans the optical interface of the connector. Such a dislodged pad can get stuck behind a shutter and over the optical interface thus requiring additional user intervention to remove the pad from the connector, or alternatively leaving the connector in an unusable state.

Additionally, the above-described conventional tape application approach, which requires the user to (i) load a tape onto a handheld tool and (ii) then maneuver the handheld tool such that a portion of the tape contacts an optical interface, is not well-suited for cleaning particular types of optical connectors. In particular, for connectors having protruding features (e.g., shutters, alignment pins, etc.), it is difficult for the user to maneuver the handheld tool such that the tape cleans locations near the protruding features. Due to the wiping action needed to clean the fibers with the handheld tool, any abrasive particles on the surface of the connector will be wiped across the face of the connector and may permanently damage the fibers. Also, after the tape on the handheld tool is used up, the tape is difficult to replace (e.g., it is difficult for the user to remove a used dirty roll of tape from the handheld tool and to install a new clean roll of tape onto the handheld tool).

Furthermore, the above-described conventional cleaning liquid approach tends to be rather messy. In particular, there is little control over how much volatile liquid the user applies. If the user applies too little liquid, the liquid may not provide adequate cleaning results. On the other hand, if the user applies too much liquid, there is little control over the flow of the excess liquid, e.g., the applied excess liquid, which now carries contaminants, can inadvertently spill onto other components and contaminate those components. Additionally, although the liquid eventually evaporates, use of the liquid tends to leave behind a residue over the optical interfaces, and it is very likely that dissolved contaminants could flow back and precipitate over the optical interfaces to re-contaminate those optical interfaces. Also, in some instances, the volatile liquid has not been very effective in removing certain types of materials (e.g., small particles and certain oils) which are common contaminants of optical connectors and common sources of light energy loss at optical interfaces.

Also, the above-described conventional cloth application approach tends to require an extensive amount of manual effort and time from the user. In particular, the user individually wipes each optical interface with a portion of a lint-free cloth or wipe. Such a cleaning operation can be particularly difficult when the optical interfaces reside in hard-to-reach locations such as on a backplane at the back of a card cage. Moreover, in some situations, the user must meticulously add liquid to the lint-free cloth prior to wiping. Accordingly, the conventional cloth application approach requires excessive time and effort from the user.

The invention is directed to techniques for cleaning an optical connector which involves directing fluid toward an optical interface of the optical connector through a cleaning head, and drawing the directed fluid away from the optical interface of the optical connector and toward the cleaning head. The directed fluid (e.g., a gas, gaseous snow, etc.) is well-suited for removing contaminants such as large particles, small particles, oil and grease. Additionally, since the fluid is drawn away from the optical interface and toward the cleaning head, there is little opportunity for any contaminants carried by the fluid to fall back over the optical interface and again cause contamination. Furthermore, the use of environmentally safe gases (e.g., carbon dioxide, nitrogen, etc.), as the fluid, is clean and manageable. That is, the gas is easy to handle and direct over and around various parts of the connector for enhanced cleaning (e.g., for cleaning any shutters, for cleaning around any guide pins, for cleaning the optical interfaces, etc.) without harming the user. Moreover, particular operations of the invention techniques can be automated to simplify and minimize manual effort by a user, as well as to ensure consistency and proper cleaning of optical connectors.

One embodiment of the invention is directed to a system for cleaning a set of optical connectors. The system includes a fluid source, a vacuum source, a support member which defines a cleaning device edge, and a set of cleaning devices. Each cleaning device includes (i) a fluid intake member which connects to the fluid source, (ii) a fluid output member which connects to the vacuum source, and (iii) a cleaning head which connects to the fluid intake and output members. Each cleaning device is disposed along the cleaning device edge of the support member. The set of cleaning devices is configured to (i) align over a set of optical interfaces of the set of optical connectors, (ii) direct fluid from the fluid source toward the set of optical interfaces, and (iii) draw the directed fluid away from the set of optical interfaces and toward the vacuum source. Accordingly, multiple optical interfaces can be cleaned simultaneously in an organized and coordinated manner.

In one arrangement, the fluid includes an environmentally safe gas (e.g., carbon dioxide, nitrogen, air, etc.) and the cleaning head includes a nozzle which is configured to eject the gas toward the optical interface of the optical connector. In one arrangement, the fluid includes dry gas to reduce moisture condensation due to the cryogenic affect of pressurized gaseous cleaning fluid on the optical surface (e.g., the dry gas can be lower pressure carbon dioxide which is directly "TEE'd" off the fluid source, nitrogen, filtered air, etc.). Accordingly, the fluid can physically dislodge dust, oil and grease from the optical interface (e.g., micro-sandblasting) in an environmentally safe manner.

In one arrangement, a high frequency pulse source couples to the cleaning head. The high frequency pulse source is configured to place high frequency pulses into the gas when the cleaning head directs the fluid from the fluid intake member toward the optical interface of the optical connector. Accordingly, the system can impart periodic increases in momentum into the fluid to further facilitate the dislodging of contaminating particles from the optical connector.

In one arrangement, the fluid includes ionized gas to neutralize the static charge on the optical surface of the optical connector. Such neutralization reduces the amount of dust attracted back to the optical surface after cleaning.

In one arrangement, the cleaning head further forms and directs snow (i.e., solid particles) toward the optical interface of the optical connector. In this arrangement, the nozzle is configured to spray the snow (e.g., solid carbon dioxide particles formed by rapid gas or liquid expansion also known as the Joule-Thompson Effect) toward the optical interface. In one arrangement, the snow operates as an organic solvent to facilitate removal of certain organic grease and oil contaminants and films, and the velocity of the snow jet provides momentum transfer force to facilitate removal of certain dust and particle contaminants. After the snow material exits from the nozzle, the material changes phase to a gaseous state enabling the contaminants to precipitate and be carried away from the optical interface along with the gas.

In one arrangement, the nozzle defines multiple ducts such that the fluid outputs toward the optical interface of the optical connector through the multiple ducts defined by the nozzle. Accordingly, the fluid can be directed over the entire optical interface for thorough and comprehensive cleaning.

In one arrangement, the optical connector further has a set of optical interface shutters. In this arrangement, the cleaning head is further configured to, prior to directing the fluid toward the optical interface of the optical connector, (i) dispense the fluid over the set of optical interface shutters, and (ii) actuate the optical connector such that the set of optical interface shutters moves to expose the optical interface. Accordingly, the same fluid can be used for cleaning the outer locations of the connector thus decreasing the likelihood of introducing contaminants residing in the vicinity of the optical interface prior to cleaning the optical interface (e.g., thus avoiding pushing dirt from the connector exterior onto the optical interface).

In one arrangement, the cleaning head includes a set of swabs, and an actuator. The actuator is configured to (i) hold each swab in place prior to actuation, and (ii) release a portion of each swab when actuated to cause that portion to contact the optical interface of the optical connector. In one arrangement, the cleaning head nozzle is configured to direct the fluid such that the fluid pushes the portion of each swab onto the optical interface of the optical connector when the actuator is actuated. Accordingly, the system provides multiple mechanisms for cleaning the optical interface, i.e., fluid to dislodge particles and oils as well as swabs for mechanically wiping the optical interface surface to pick up any material which could not be dislodged by the fluid.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 3A is a cross-sectional view of a cleaning head of the cleaning system and an optical connector prior to a cleaning operation.

FIG. 3B is a cross-sectional view of the cleaning head and the optical connector during a first phase of the cleaning operation.

FIG. 3C is a cross-sectional view of the cleaning head and the optical connector during a second phase of the cleaning operation.

FIG. 3D is a cross-sectional view of the cleaning head and the optical connector during a third phase of the cleaning operation.

DETAILED DESCRIPTION

The invention is directed to techniques for cleaning an optical connector which involves directing fluid toward an optical interface of the optical connector through a cleaning head, and drawing the directed fluid away from the optical interface of the optical connector and toward the cleaning head. The directed fluid (e.g., gas) is well-suited for dislodging contaminants such as large particles, small particles and oils. Additionally, since the fluid is drawn away from the optical interface toward the cleaning head, there is little opportunity for these contaminants to fall back over the optical interface to cause recontamination. Furthermore, the use of environmentally safe gases (e.g., carbon dioxide, nitrogen, air, etc.), as the fluid, is clean and manageable. That is, such gases are easy to handle and to direct over and around various parts of the connector for enhanced cleaning (e.g., for cleaning any shutters, for cleaning around any guide pins, for cleaning the optical interfaces, etc.). Moreover, particular operations can be automated to simplify and minimize manual effort by a user, as well as to ensure consistency and proper cleaning of optical connectors.

Figure 1:
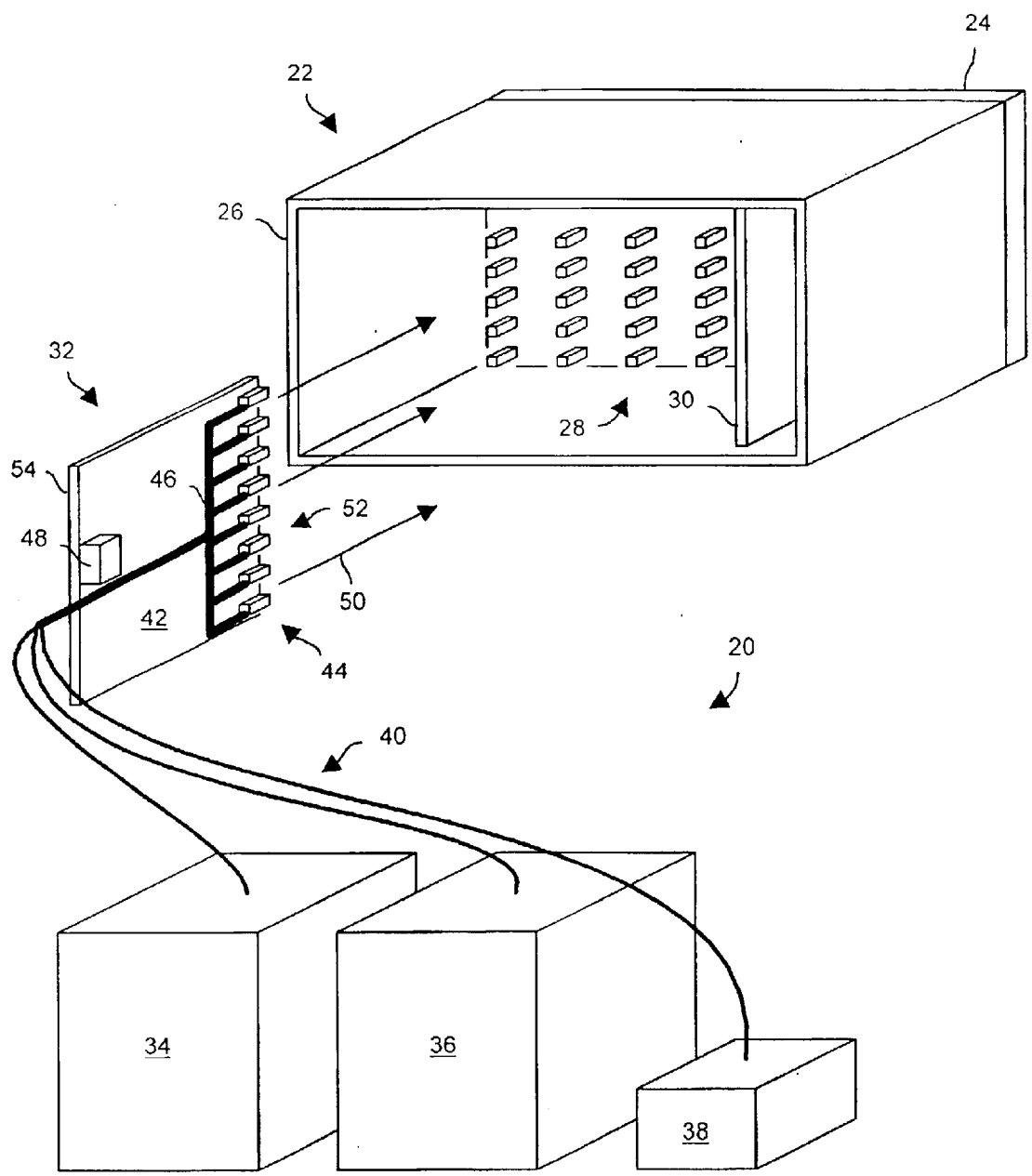
FIG. 1 is a perspective view of a cleaning system which is suitable for use by the invention.

FIG. 1 shows a perspective view of a cleaning system 20 which is suitable for use by the invention. By way of example only, the cleaning system 20 is configured to clean a fiber optic assembly 22 having a fiber optic backplane 24 and a card cage 26 which is in a fixed position relative to the fiber optic backplane 24. The fiber optic backplane 24 includes columns of fiber optic connectors 28 which are configured to connect to fiber optic circuit boards 30, i.e., circuit boards having fiber optic components which connect to the fiber optic connectors 28.

As shown, the cleaning system 20 includes a cleaning assembly 32, a fluid source 34, a vacuum source 36, a control panel 38 and connection media 40. The cleaning assembly 32 includes a support member 42, a set of cleaning devices 44, a set of connections 46 and a controller 48. The set of connections 46 and the connection media 40 connect the set of cleaning devices 44 of the cleaning assembly 32 individually to the fluid source 34, the vacuum source 36, and the control panel 38. In one arrangement, the components 32, 34, 36, 38, and 40 reside on a small portable cart (e.g., a push or pull cart) or box (e.g. hand carried) with a power supply (e.g., a main power supply with a retractable cord, a rechargeable power supply, etc.) to enable easy transportation of the equipment (e.g., to move the equipment to customer sites in the field).

The fluid source 34 is configured to provide a fluid to the cleaning assembly 32 and is under control of the control panel 38. In one arrangement, the fluid source 34 includes a tank of pressurized fluid, and the control panel 38 is configured to open and close a valve to the tank. In another arrangement, the fluid source 34 includes a tank of fluid and a compressor, and the control panel 38 controls the valve as well as starts and stops the compressor. In another arrangement, the fluid source 34 includes a pump and a drying filter, and the control panel 38 activates and deactivates the pump to provide dry air to the cleaning assembly 32. Other configurations are suitable for use as the fluid source 34 as well.

The vacuum source 36 is configured to provide a vacuum to the cleaning assembly 32 and is under control of the control panel 38. That is, the control panel 38 is configured to activate and deactivate the vacuum source 36. In one arrangement, the vacuum source 36 includes a filtering assembly and a pump, and the control panel 38 is configured to start and stop the pump to provide suction from the cleaning assembly 32 through the connection media 40 to the vacuum source 36 where fluid and dislodged contaminants removed by the cleaning assembly 32 are caught by the filter. In another arrangement, the vacuum source 36 includes a holding tank and a pump, and the control panel 38 is configured to start and stop the pump in order to draw the fluid and contaminants from the cleaning assembly 32 into the tank. In another arrangement, the vacuum source 36 is simply a connection to the atmosphere (e.g., to a chamber at atmospheric pressure), and the fluid source 34 provides fluid at higher pressure than that of the vacuum source 36 to evacuate to the atmosphere (e.g., 14.5 psi).

It should be understood that a variety of fluids are suitable for use by the cleaning system 20. In one arrangement, the fluid source 34 provides a gas such as carbon dioxide, nitrogen or dry air, all of which are environmentally safe. In one arrangement, the fluid includes ionized gas to neutralize the static charge on the optical surface of the optical connector, thus reducing the amount of dust attracted back to the optical surface after cleaning. In another arrangement, the fluid source 34 provides a liquid such as a volatile cleaning solution. In yet another arrangement, the fluid source 34 provides solid particles (e.g., carbon dioxide snow formed by rapidly expanding carbon dioxide gas). In other arrangements, the fluid source 34 provides combinations thereof (e.g., a combination of gas and snow, a combination of gas and a cleaning solution, etc.).

The control panel 38 and the controller 48 provide the user with control over the operation of the cleaning system 20. In particular, the control panel 38 enables a user to control the operation of the fluid source 34 and the vacuum source 36 (e.g., to open/close a control valve to the fluid source 34, to start/stop a pump of the vacuum source 36, etc.). Furthermore, the controller 48 enables the user to more locally control the operation of the cleaning assembly 32 (e.g., to dispense fluid from the fluid source 34 through the cleaning devices 44, to draw the dispensed fluid back toward the vacuum source 36 through the cleaning devices 44, etc.). Further details of how the user operates the system 20 will now be provided.

Initially, the user places the cleaning system 20 in a usable state by operating the control panel 38. In particular, the user turns on the vacuum source 36 by manipulating the controls on the control panel 38 (e.g., starts a pump which provides suction from the cleaning devices 44 through the connection media 40 into the vacuum source 36). Additionally, the user turns on the fluid source 34 by manipulating controls on the control panel 38 (e.g., opens a fluid shutoff valve, starts a compressor, etc.). A single control (e.g., a single switch) or multiple controls of the control panel 38 can be configured to activate the fluid and vacuum sources 34, 36.

Next, the user inserts the cleaning assembly 32 into a circuit board location of the fiber optic assembly 22 in a direction 50, i.e., into a slot of the card cage 26 which is not currently occupied by a circuit board 30 (because it has already been removed). The user then operates the controller 48 to perform a series of operations to clean at least one of the fiber optic connectors 28 on the backplane 24. In particular, the user operates controls (e.g., a set of switches) of the controller 48 to apply fluid from the fluid source 34 to the column of fiber optic connectors 28 through the cleaning devices 44, and to apply a vacuum from the vacuum supply 36 in order to draw the applied fluid and any dislodged contaminants away from the fiber optic connectors 28, etc.).

It should be understood that the cleaning devices 44 are disposed along a back edge 52 of the support member 42 of the cleaning assembly 32, and the controller 48 is disposed on a front edge 54 of the support member 42 so that the user does not need to reach into the card cage 26 when cleaning the optical connectors 28. Rather, the user can simply insert the cleaning assembly 32 into slots of the card cage 26, and operate the controller 48 near the front edge 54 of the fiber optic assembly 22. The cleaning devices 44 along the back edge 52 of the support member 42 apply the fluid and draw the fluid and any dislodged contaminants away (e.g., particulated fluid, waste fluid, etc.) from the optical connectors 28 under control of the user manipulating the controller 48. Further details of the invention will now be provided with reference to FIG. 2.

Figure 2:
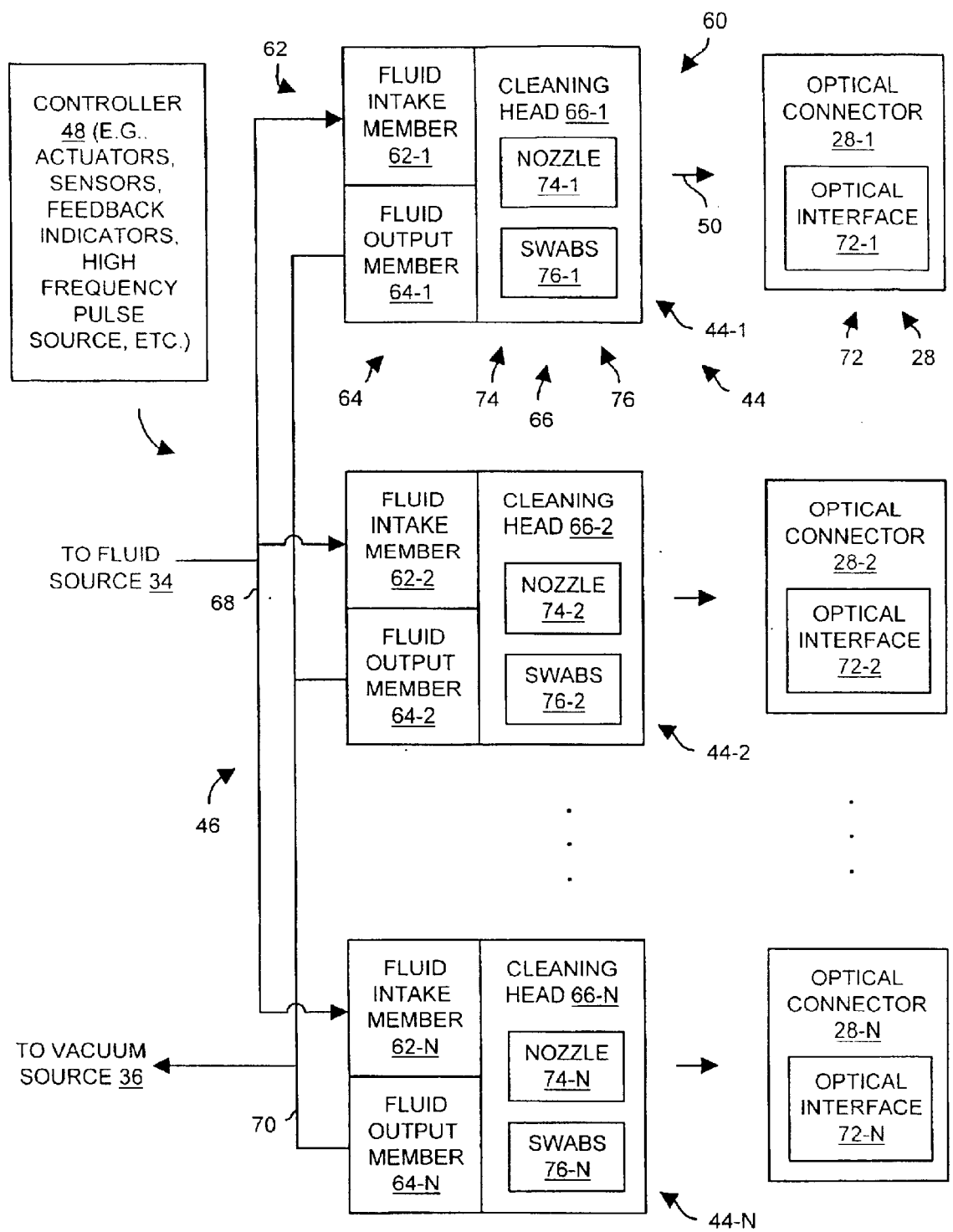
FIG. 2 is a block diagram of a portion of the cleaning system of FIG. 1.

FIG. 2 is a block diagram of a portion 60 of the cleaning assembly 32. As shown, the portion 60 includes N cleaning devices 44-1, 44-2, ..., 44-N (collectively, cleaning devices 44). Each cleaning device 44 includes a fluid intake member 62, a fluid output member 64, and a cleaning head 66. The set of connections 46 of the cleaning assembly 32 includes a fluid supply manifold 68 which connects the fluid intake members 62 of the cleaning devices 44 to the fluid source 34. The fluid supply manifold 68 is configured to carry fluid from the fluid source 34 to the fluid intake members 62 (through the connection media 40, also see FIG. 1). Similarly, the set of connections 46 includes a vacuum supply manifold 70 which connects the fluid output members 64 of the cleaning devices 44 to the vacuum source 36 through the connection media 40. The vacuum supply manifold 70 is configured to carry dispensed fluid and any dislodged contaminants from the cleaning assembly 32 to the vacuum source 36 through the connection media 40.

As further shown in FIG. 2, each cleaning device 44 corresponds to an optical connector 28 of the fiber optic assembly 22 (also see FIG. 1). For example, the cleaning device 44-1 is associated with the optical connector 28-1, the cleaning device 44-2 is associated with the optical connector 28-2, and so on. Accordingly, the cleaning head 66-1 of the cleaning device 44-1 is configured to align with an optical interface 72-1 of the optical connector 28-1, the cleaning head 66-2 of the cleaning device 44-2 is configured to align with an optical interface 72-2 of the optical connector 28-2, and so on.

As described above, the cleaning assembly 32 is configured to insert into a slot of the card cage 26 of the fiber optic assembly 22 in place of a circuit board 30 in order to clean a column of optical connectors 28 of the backplane 24. To this end, the user moves the cleaning assembly 32 in the direction 50 toward the column of optical connectors 28 such that the cleaning devices 44 align with the connectors 28. At this point, the cleaning heads 66 of the cleaning devices 44 are positioned adjacent the optical interfaces 72 of the optical connectors 28. In particular, nozzles 74 of the cleaning heads 66 aim toward the optical interfaces 72. Additionally, swabs 76 of the cleaning heads 66 are loaded and ready to wipe the optical interfaces 72.

Next, the user operates the controller 48 (also see FIG. 1) causing the cleaning assembly 32 to clean the column of optical connectors 28. In particular, the user directs fluid from the fluid source 34 toward the optical interfaces 72 of the optical connectors 28 through the cleaning heads 66 (i.e., through the nozzles 74 of the cleaning devices 66). At the same time, the user applies a vacuum from the vacuum source 36 over the optical interfaces 72 through the cleaning heads 66 to draw the directed fluid and any dislodged contaminants away from the optical interfaces 72 and through the cleaning heads 66 toward the vacuum source 36.

In one arrangement, the user uses the cleaning assembly 32 to dispense the fluid over exterior locations around the optical interfaces 72 (e.g., a peripheral region around a set of protective shutters), and to draw the dispensed fluid away from the exterior locations and toward the vacuum source 36 prior to cleaning the optical interfaces 72. Accordingly, the user has the capability of cleaning the outside areas of the optical connectors 28 prior to cleaning the optical interfaces 72, thus preventing any dirt or debris outside the optical connectors 28 from being pushed toward the optical interfaces 72 by the cleaning assembly 32.

While the user applies the fluid to the optical interfaces 72 and draws the fluid and any dislodged contaminants away from the optical interfaces 72, the user releases portions of the swabs 76 which are preloaded within the cleaning heads 66. The fluid pushes the released portions of the swabs 76 against the optical interfaces 72. Accordingly, the swabs 76 are available to remove any remaining contaminants from the optical interfaces 72 that were not dislodged simply by the directed fluid.

From the description above, it should be understood that the cleaning operation of the cleaning assembly 32 is essentially a multi-step process. That is, during a first step, the cleaning assembly 32 cleans the periphery of the optical connectors 28 using the fluid. Such cleaning of the outer regions of the optical connectors 28 prevents particle migration toward the optical interfaces 72. Then, during a second step, the user cleans the optical interfaces 72 of the optical connectors 28 predominantly using the fluid. Next, during a third step, the user cleans the optical interfaces 72 using the swabs 76 in combination with the fluid (e.g., dry air). Accordingly, the user can thoroughly clean the optical connectors 28 of the fiber optic assembly 22 in a consistent and methodical manner. The user does not need to exert great manual effort by reaching into the card cage 26 and meticulously maneuvering a small handheld tool or dealing with messy volatile liquid. Rather, the user can simply insert the cleaning assembly 32 into slots of the card cage 26 and operate the controller 48 on the front edge 54 (FIG. 1) of the support member 48 to clean the optical connectors 28 through the cleaning devices 44 along the back edge 52 of the support member 48.

As will be described in further detail later, the controller 48 is configured to simplify the work of the user. For example, the controller 48 is capable of activating and deactivating a high frequency pulse source to impart additional momentum to the applied fluid for enhanced cleaning, e.g., to enable the fluid to dislodge particularly difficult contaminants. Additionally, the user can rely on actuators and feedback sensors which improve automation of the cleaning operation. Further details of the invention will now be provided with reference to FIGS. 3A through 3D.

FIGS. 3A through 3D illustrate the interaction between a cleaning head 66 and an optical connector 28 during the cleaning process. Such interaction occurs as the user moves the cleaning assembly 32 (FIG. 1) within a slot of the card cage 26 either manually or by operating the controller 48 (e.g., actuating robotics or actuators, etc.). It should be understood that what will now be described for the cleaning head 66 and optical connector 28 of FIGS. 3A through 3D applies to each cleaning head 66 and each column of optical connectors 28 when the user operates the cleaning assembly 32 to clean an entire column of optical connectors 28 of the fiber optic assembly 22 (also see FIG. 1).

As shown in FIG. 3A and by way of example only, the optical connector 28 includes a cover assembly 82 and a base assembly 84. Again, by way of example only, the base assembly 84 includes multiple optical interfaces 72-A, 72-B (also see FIG. 2). The cover assembly 82 operates as a sliding shroud and includes a sleeve member 86 and a set of shutters 88 hinged relative to the sleeve member 86. The base assembly 84 includes a set of ferrules 90-A, 90-B (collectively, ferrules 90) which holds ends of optical fibers to form the optical interfaces 72-A, 72-B. The base assembly 84 further includes a set of base portions 92-A, 92-B (collectively, base portions 92), and a set of springs 94-A, 94-B (collectively, springs 94). The springs 94 are configured to allow the ferrules 90 to move within their respective base portions 92, but assert force on the ferrules 90 to hold the ferrules 90 in respective stable positions within the base portions 92 (in one arrangement, the springs maintain physical contact between ferrules when mated). Additionally, the cover assembly 82 is movable relative to the base assembly 84. In particular, movement of the sleeve member 86 along the base assembly 84 results in actuation of the shutters 88 to expose the optical interfaces 72.

As further shown in FIG. 3A, the cleaning head 66 includes a housing 96 and an actuator 98 which is movable (e.g., slides) relative to the housing 96. The housing 96 defines a nozzle 74 having multiple ducts 100 and holds a set of swabs 76 (also see FIG. 2). The housing 96 further defines a set of return channels 102. The distributed configuration of ducts 100 and return channels 102 is well-suited for providing a thorough and comprehensive application of fluid (e.g., gas, liquid or snow) to the entire outer region of the optical connector 28 to remove contaminants.

When the user operates the controller 48 of the cleaning assembly 32 (FIG. 1), the user releases fluid 104 from the fluid source 34 through the ducts 100 of the nozzle 74. Simultaneously, the user provides a vacuum 106 (shown pointed away from the nozzle 74 to illustrate direction of fluid movement) through the set of return channels 102 to draw the released fluid 104 back toward the cleaning head 66 and to the vacuum source 36. Typically, the user moves the cleaning assembly 32 into contact with a column of optical connectors 28 prior to releasing the fluid 104 in order to avoid unnecessarily dispensing fluid randomly which could stir up dust or debris that could contaminate the fiber optic assembly 22.

FIG. 3B shows the cleaning head 66 mated with the optical connector 28. As shown, the housing 96 of the cleaning head 66 engages the cover assembly 82 (e.g., complimentary surfaces of the housing 96 and the sleeve member 96 of the cover assembly 82 interlock) to form a substantially closed chamber 110 over the set of shutters 88 of the optical connector 28. The user positions the cleaning assembly 32 within a slot of the card cage 26 (FIG. 1) such that a suitable amount of force is applied on the cleaning head 66 in the direction 112 to properly seal the chamber 110 without substantially moving the cover assembly 82. Accordingly, the cleaning head 66 exerts a proper amount of force to form a relatively tight seal around the chamber 110, but not so much force as to actuate the set of shutters 88 (a feature which will be described in more detail shortly). In one arrangement, the controller 48 (FIGS. 1 and 2) includes a set of actuators which precisely control the position of the cleaning assembly 32 relative to the backplane 24 (i.e., the position of the cleaning heads 66 relative to the optical connectors 28) in order to engage the cleaning heads 66 with the optical connectors 28 (see FIG. 3B).

At this point, the user can safely dispense the fluid 104 from the nozzle 74 to dislodge contaminants from the peripheral area around the set of shutters 88 and draw the dispensed fluid and any dislodged contaminants back to the vacuum source through the cleaning head 66. The nozzle 74 ejects the fluid from the fluid source 34 out the multiple ducts 100 in the direction 112 toward the set of shutters 88 and over the periphery of the optical connector 28. Simultaneously, the vacuum source 38 draws the ejected fluid back through the return ducts 102 of the cleaning head 66 while the chamber 110 remains substantially sealed. As a result, there is little or no dirt or debris left in the peripheral area that could otherwise be pushed toward the optical interfaces 72 in subsequent cleaning operations. That is, since the chamber 110 is substantially sealed, any loose contaminants (e.g., dust, dislodged grease particles, etc.) flow with the fluid into the return channels 102 of the cleaning head 66 and then to the vacuum source 38. Accordingly, it is unlikely that debris will escape from the chamber 110 and contaminate something else (e.g., another optical connector 28). Also, fluid will not substantially escape which could otherwise disturb and uncontrollably move around (i.e., stir up) contaminants in the vicinity. As a result, dirt will not be blown around or drawn toward the optical connector 28.

FIG. 3C shows the cleaning head 66 and the optical connector 28 in a further engaged state which substantially maintains the sealed chamber 110. In particular, the user positions the cleaning assembly 32 such that the cleaning head 66 exerts additional force on the cover assembly 82 to push the sleeve member 86 in the direction 112 and thus actuate the shutters 88-A, 88-B (collectively, shutters 88). Accordingly, the shutters 88 move from being substantially perpendicular to the direction 112 to being in line with the direction 112 to expose the optical interfaces 72. Additionally, the cleaning head 66 is slightly closer to the optical interfaces 72 than before when the cleaning head 66 cleaned the periphery of the optical connector 28. The nozzle 74 of the cleaning head 66 directs the fluid 104 toward the optical interfaces 72. Furthermore, the cleaning head 66 draws the directed fluid 104 and any contaminants dislodged from the optical interfaces 72 away from the optical interfaces 72 and toward the vacuum source 38, i.e., a fluid drawing device.

It should be understood that the distributed configuration of ducts 100 and return channels 102 within the cleaning head 66 applies the fluid 104 in the direction 112 to the entire area of the optical interfaces 72 and then draws that fluid 104 away for direct and widespread cleaning. Contaminants are dislodged, dissolved and flushed away from the chamber 110 back into the cleaning head 66 and to the vacuum source 38 to avoid contaminating other optical connectors 28.

Additionally, it should be understood that the force between the cleaning head 66 and the optical connector 28 is greater in FIG. 3C than in FIG. 3B so that the sleeve member 86 moves (e.g., under a resistive spring load) in the direction 112 to open the shutters 88. In one arrangement, the application of such additional force is under manual control of the user (e.g., the user pushes harder on the front edge 54 of the support member 42, see FIG. 1). In another arrangement, the user controls the position and applied force of the cleaning assembly 32 using the controller 48 (e.g., the controller 48 operates robotic actuators).

It should also be understood that some optical connectors 28 include protruding features such as guide pins (shown as dashed lines in FIGS. 3C and 3D). The cleaning head 66 is configured to accommodate such features. By way of example only and as shown in FIG. 3C, the guide pins (if any) partially insert into apertures of the cleaning head 66 (e.g., the ducts 100 or return channels 102) in a manner that does not block the flow of fluid therethrough. Further details of the invention will now be described with reference to FIG. 3D.

FIG. 3D shows the cleaning head 66 and the optical connector 28 after the controller 48 moves the actuator 98 in a direction 120 opposite the direction 112 to release portions of the swabs 76. In one arrangement, the user operates a control to move the actuator 98. In another arrangement, expiration of a timer in the controller 48 initiates actuation of the actuator 98. In response, tabs (or grippers) 122 within the cleaning head 66 which previously held portions of the swabs 76 in place, move away from the portions of the swabs 76 as shown in FIG. 3D. At this point, the fluid 104 pushes the portions of the swabs 76 (i.e., the ends of the swabs 76) toward the optical connector 28 and in physical contact with the optical interfaces 72. Accordingly, the wiping action of the swabs 76 can dislodge, hold and/or attract particularly stubborn contaminants (e.g., small particles, grease, oil, etc.) which remained after the fluid application shown in FIG. 3C. Such contaminants can fall away and be carried into the return channels 102 along with the applied fluid 104, or alternatively remain affixed to the swabs 76, for removal from the optical interfaces 72.

After the user operates the cleaning assembly 32 (FIG. 1) on a column of optical connectors 28 of the fiber optic assembly 22, the end result is a thoroughly cleaned column of optical connectors 28. In particular, the optical interfaces 72 of each optical connector 28 is cleaned by both a directed fluid 104 and a set of wiping swabs 76. Furthermore, the applied fluid as well as any dislodged contaminants are withdrawn from the column of optical connectors 28 toward the vacuum source 38 so that the contaminants do not settle on and contaminate other optical connectors 28.

As described above in connection with FIGS. 3A through 3D, the user cleans a whole column of optical connectors 28 simply by changing the position of the cleaning assembly 32 within a slot of the card cage 26 and operating a controller 48 on the front edge 54 of the cleaning assembly 32. It should be understood that the operation of the cleaning assembly 32 does not demand extensive or meticulous manual effort from the user such as reaching into the back of the card cage 26 with a small handheld tool. Further details of how the swabs operate to clean the optical interfaces 72 will now be provided with reference to FIGS. 4A through 4D.

Recall that movement of the actuator 98 in the direction 120 opposite the fluid application direction 112 results in release of the swabs 76. FIGS. 4A through 4D show the cleaning operation of a swab 76 when the swabs 76 are released by the tabs 122 (FIG. 3D).

Figure 4A:
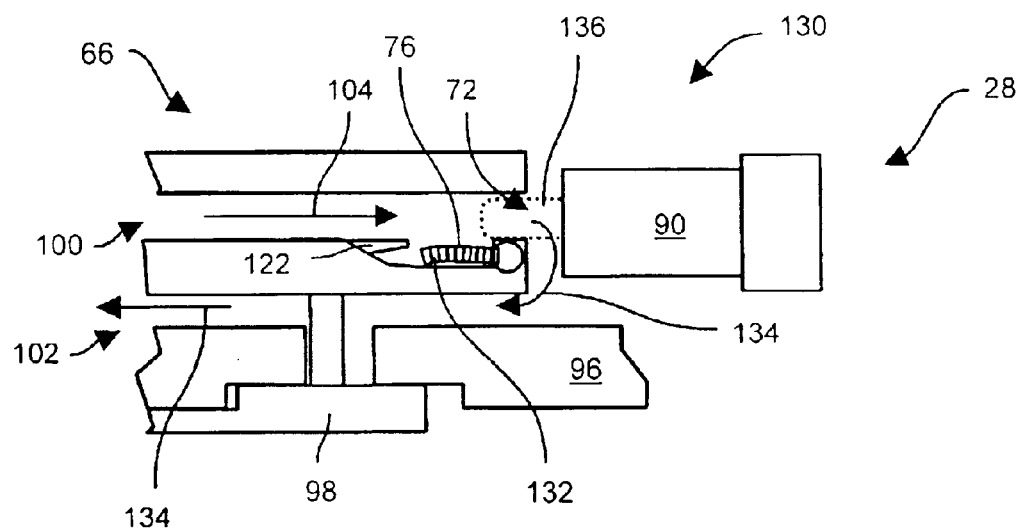
FIG. 4A is a cross-sectional view of a portion of the cleaning head at a beginning of the third phase of the cleaning operation.

FIG. 4A shows a close-up view 130 shortly after the tab 122 has moved away from the end 132 of the swab 76. The fluid 104 continues to flow from the ducts 100 of the cleaning head 66 toward the optical interface 72 of the optical connector 28. The dispensed fluid and any dislodged contaminants 134 then flow toward the return channels 102 of the cleaning head 66. By way of example only, the optical connector 28 includes a guide pin 136 which enters a portion of a duct 100 to enable the cleaning head 66 and the optical connector 28 to properly engage without hindrance.

Figure 4B:
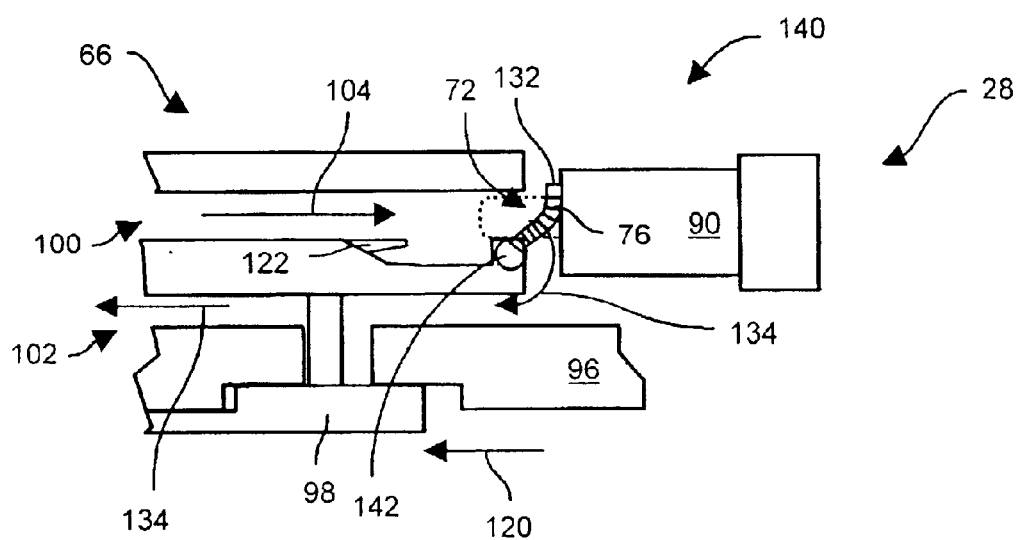
FIG. 4B is a cross-sectional view of the portion of the cleaning head at a time shortly after that shown in FIG. 4A.

FIG. 4B shows a close-up view 140 shortly after the fluid 104 carries the swab end 132 toward the optical interface 72 of the optical connector 28. During movement of the swab end 132, the swab 76 essentially pivots about a hinge point 142 at the other end of the swab 76. At this point, the fluid 104 pushes the swab end 132 into contact with the optical interface 72. In one arrangement, the actuator 98 is configured to mechanically press the swab end 132 against a surface of the optical interface 72. In one arrangement, the swab end 132 includes adhesive material which is configured to capture contaminants from the optical interface 72

(e.g., particularly stubborn contaminants which were not dislodged by the fluid alone). Accordingly, any additional contaminants that were not dislodged or dissolved by the fluid 104 alone, can be removed by the wiping action and/or the adhesive material of the swab 76.

Figure 4C:
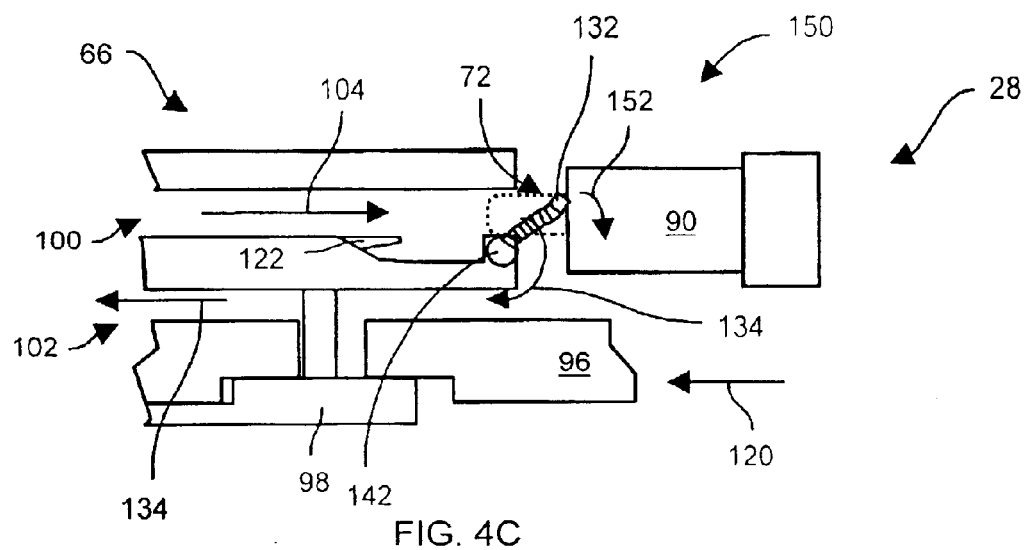
FIG. 4C is a cross-sectional view of the portion of the cleaning head at a time shortly after that shown in FIG. 4B.

FIG. 4C shows a close-up view 150 shortly after the cleaning head 66 begins moving away from the optical interface 72, e.g., due to the user pulling the cleaning assembly partly out of the card cage slot. At this point, the dispensed fluid and any dislodged contaminants 134 continue to flow into the return channels 102. Additionally, the swab end 132 continues to wipe the optical interface 72 in an arcing motion 152. It should be understood that the cleaning head 66 is still somewhat engaged with the optical connector 28 so that the shutters 88 (FIGS. 3A through 3D) have not yet closed.

Figure 4D:
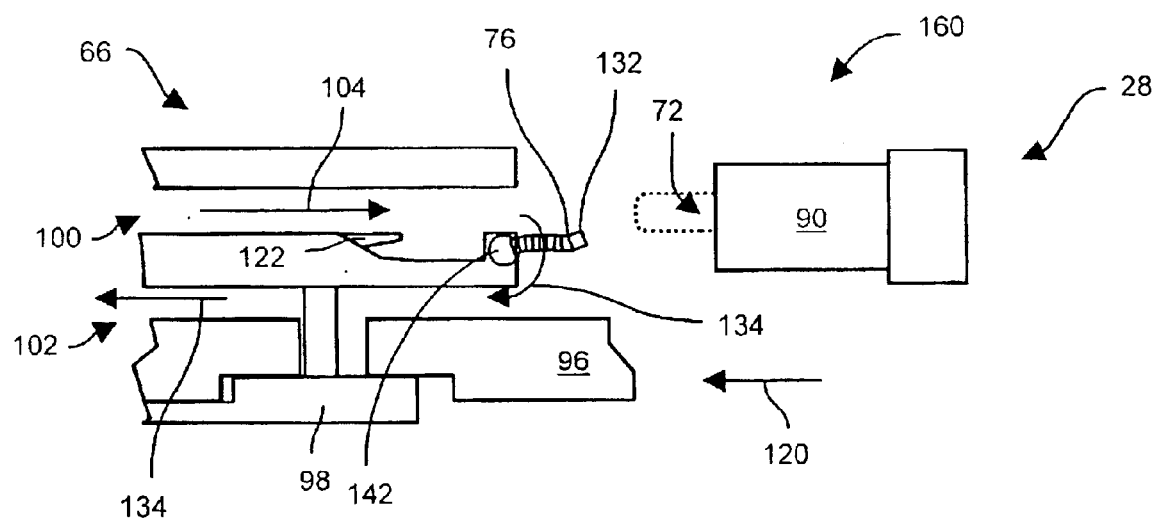
FIG. 4D is a cross-sectional view of the portion of the cleaning head at a time shortly after that shown in FIG. 4C.

FIG. 4D shows a close-up view 160 shortly after the cleaning head 66 moves so far away from the optical interface 72 that the swab end is no longer in contact with the optical interface 72. Accordingly, the dispensed fluid and any dislodged contaminants 134 are drawn away from the optical interface either through the return channels 102 or because they remain affixed or attracted to the swab 76. As such, the contaminants cannot settle back on the optical interface 72 or contaminate another component (e.g., another optical interface 72). Such extensive cleaning occurs by the user simply releasing the swab ends 132 using the controller 48 and changing the position of the cleaning assembly 32 within a slot of the card cage 26 (FIG. 1). Accordingly, the operation of the cleaning assembly 32 does not demand extensive or meticulous effort from the user. A summary of how the user operates the cleaning assembly 32 will now be provided with reference to FIG. 5.

Figure 5:
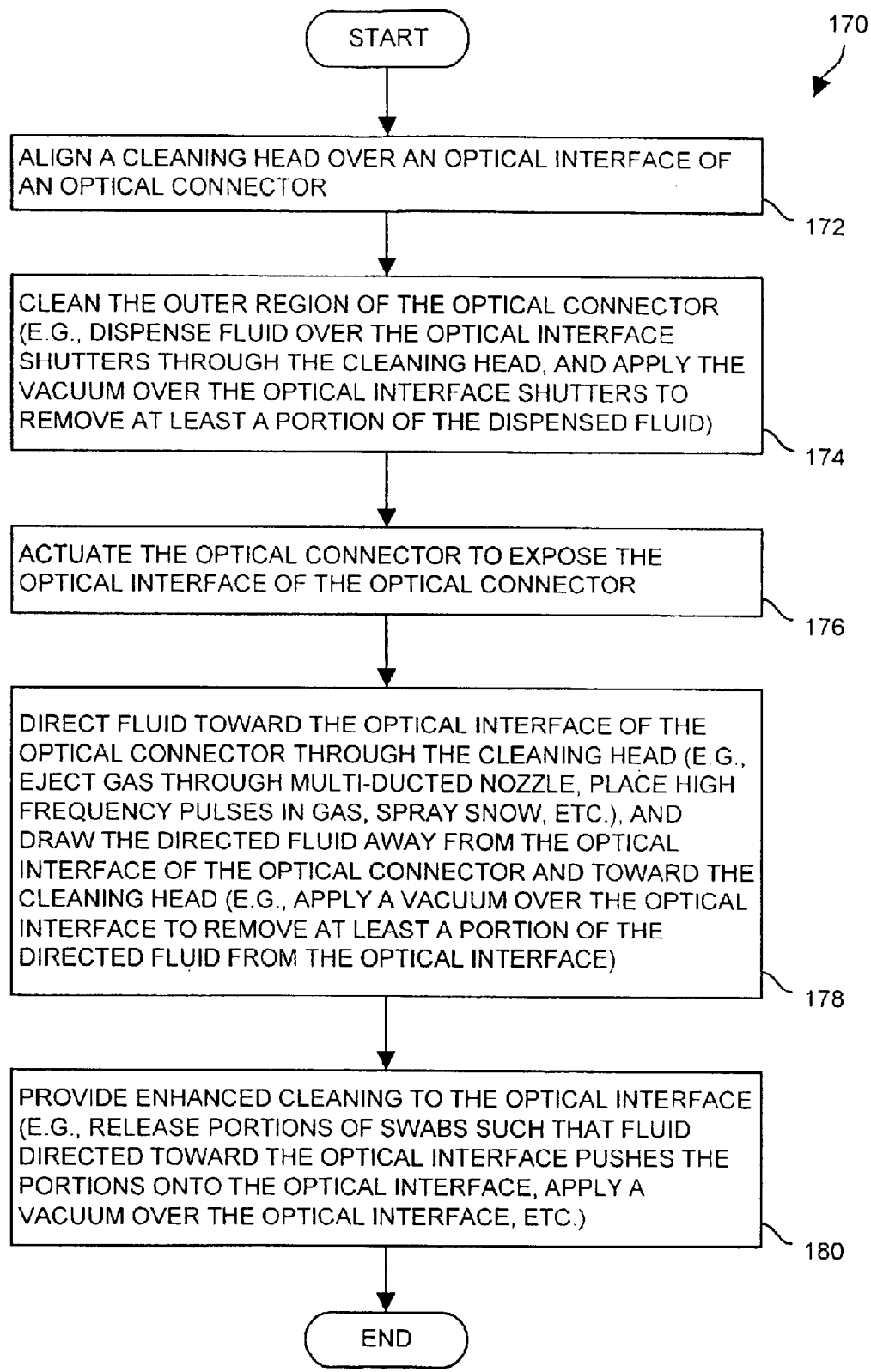
FIG. 5 is a flowchart of a procedure which is performed by a user when cleaning an optical connector using the cleaning system shown in FIG. 1.

FIG. 5 is a flowchart of a procedure 170 which is performed by a user when cleaning an optical connector 28 residing inside and at the back of the card cage 26 of the fiber optic assembly 22 (also see FIG. 1). The procedure 170 is explained in the context of cleaning a single optical connector 28 even though the cleaning assembly 32 enables the user to simultaneously clean multiple optical connectors 28.

In step 172, the user aligns a cleaning head 66 over an optical interface 72 of an optical connector 28. In particular, the user inserts the cleaning assembly 32 into a slot of the card cage 26, and pushes the cleaning assembly 32 all the way back so that the cleaning heads 66 long the back edge 52 of the support member 42 (see FIG. 1) engage with a column of optical connectors 28.

In step 174, the user cleans the outer region of the optical connector 28. In particular, the user operates the controller 48 of the cleaning assembly 32 to dispense fluid from the fluid source 34 through the cleaning heads 66 over shutters 88 covering the optical interface 72 of each optical connector 28 in the column. Simultaneously, the user draws the applied fluid and any dislodged contaminants back through the cleaning heads 66 toward the vacuum source. In one arrangement, the user operates a single control (e.g., a button or switch) which dispenses the fluid and applies the vacuum through each cleaning head 66 (e.g., the vacuum can be applied before the fluid to prevent any pressure buildup in the cleaning heads 66, the fluid can be applied before the vacuum to provide positive net pressure to avoid drawing dirt toward the connector 28, etc.). In another arrangement, the user operates separate controls to dispense the fluid and apply the vacuum.

In step 176, the user actuates the optical connector 28 to expose the optical interface 72 of the optical connector 28.

In one arrangement, the user applies additional force against the outer front edge 54 of the support member 42 to move the cleaning assembly 32 slightly further into the card cage 26 and thus move the sleeve members 82 of the optical connectors 28 to open the shutters 88 (also see FIGS. 3B and 3C). In another arrangement, the user operates the controller 48 which electronically actuates actuators (e.g., robotic mechanisms) which move the support member 42 further into the card cage 26 in an automated manner.

In step 178, the user directs fluid toward the optical interface 72 of the optical connector 28 through the cleaning head 66. In particular, the fluid (e.g., gas) ejects through multiple ducts 100 of the nozzle 74 of the cleaning head 66 toward the optical interface 72. At the same time, the ejected fluid and any dislodge particles (e.g., dirt, grease, etc.) are carried back through the cleaning head 66 toward the vacuum source 36. Accordingly, there are no contaminants left which could contaminate other components. The use of environmentally safe gas such as nitrogen, carbon dioxide or dry air does not pose an significant risk to the user since any residual gas simply dissipates. In one arrangement, the fluid is a gas which undergoes a state change to a snow (e.g., small solid particles) as it exits the nozzle 74 (e.g., the nozzle 74 is configured to cool the gas into snow, the nozzle 74 allows the fluid to rapidly expand to form snow under the Joule-Thompson Effect, etc.) to clean the optical interface 72 in a micro-sandblasting manner. In another arrangement, the fluid includes a warm dry gas to prevent condensation over the optical interface 72 and to prevent substantially cooling of the optical interface 72 (e.g., in place of the snow, following the application of the snow, etc.). Carbon dioxide gas is well-suited for this application since carbon dioxide snow (i.e., carbon dioxide gas phase-changed into small solid particles) operates as a solvent for many types of common contaminants of optical components (e.g., organic material). The carbon dioxide snow can easily be formed by adiabatic expansion of pressurized carbon dioxide gas as it ejects from the nozzle 74 of the cleaning head 66 which may easily be configured to cause a significant temperature drop due to a well known physical effect. Again, carbon dioxide snow is non-hazardous since it eventually turns back into an environmentally safe gas.

In step 180, the user provides enhanced cleaning to the optical interface 72. In particular, the user releases a portion 132 of a swab 76 within the cleaning head 66 such that the fluid pushes that portion 132 against the optical interface 72. When the portion 132 contacts the optical interface 72, any contaminants which were not dislodged by the fluid alone can be dislodged by the swab portion 132 (e.g., attach to the swab portion 132) and then be removed from the optical connector 28. As a result, the optical interface 72 is cleaned by both fluid and a swab 76. The effort by the user is straight forward and simple (e.g., insert the cleaning assembly 32 into a card cage slot and activate the controller 48). There is no need for difficult manual maneuvering of a small handheld tool or awkward reaching into recesses of the back of the card cage by hand as in some of the conventional approaches to cleaning optical connectors. Further details of how the swabs 76 are loaded within the cleaning heads 66 will now be provided with reference to FIGS. 6A through 6E.

Figure 6A:
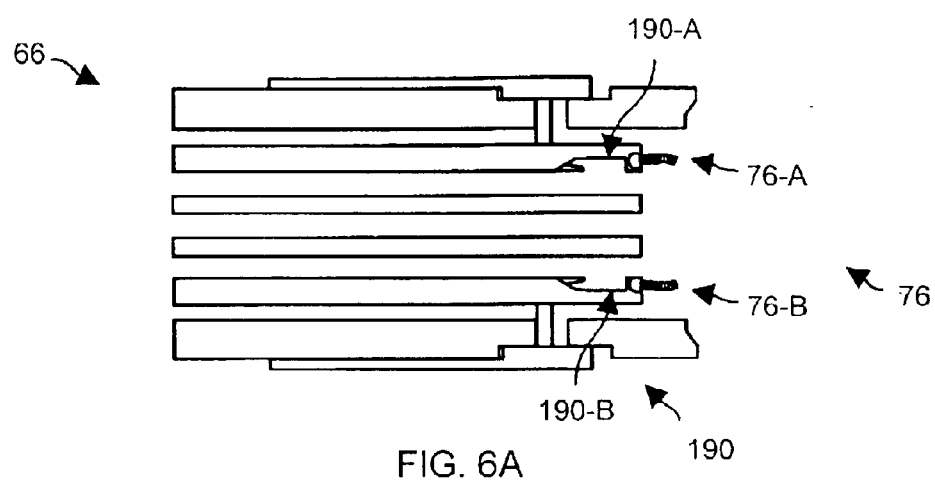
FIG. 6A is a cross-sectional view of the cleaning head after performing a cleaning operation on an optical connector.

FIG. 6A shows a cleaning head 66 and swabs 76 (i.e., the swabs 76-A, 76-B) after the cleaning head 66 has cleaned an optical connector 28. As shown, the swabs 76 have pivoted away from their initial locations 190 (i.e., locations 190-A, 190-B), e.g., pushed by the fluid. The swabs 76 are considered used since they have just contacted and cleaned an optical interface 72 of an optical connector 28.

Figure 6B:
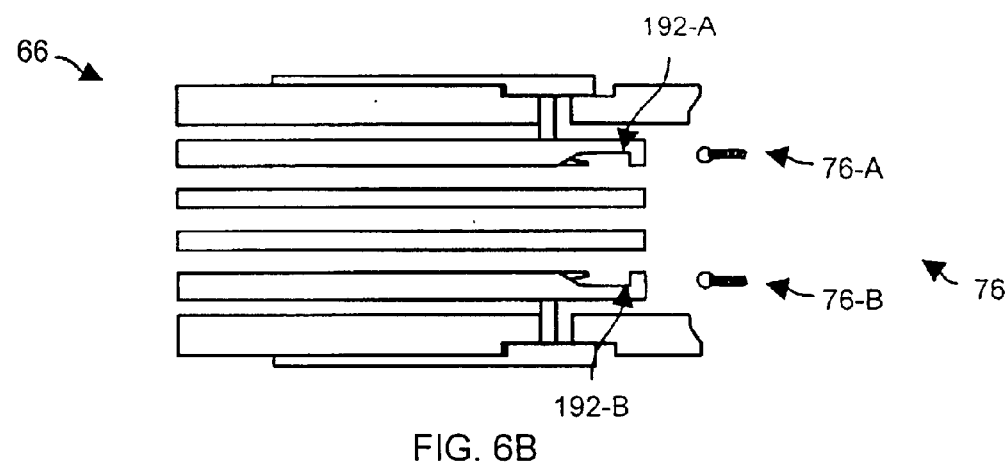
FIG. 6B is a cross-sectional view of the cleaning head when swabs of the cleaning head are removed.

FIG. 6B shows the cleaning head 66 after the user has removed the swabs 76 from the cleaning head 66. In one arrangement, the user simply actuates a control of the controller 48 which causes a robotic mechanism within the cleaning head 66 to release (e.g., eject) the swabs 76. In another arrangement, the user simply places a removal device over the cleaning head 66, and the removal device detaches the swabs 76, e.g., unhooks the swabs 76 from their attachment locations 192-A, 192-B.

Figure 6C:
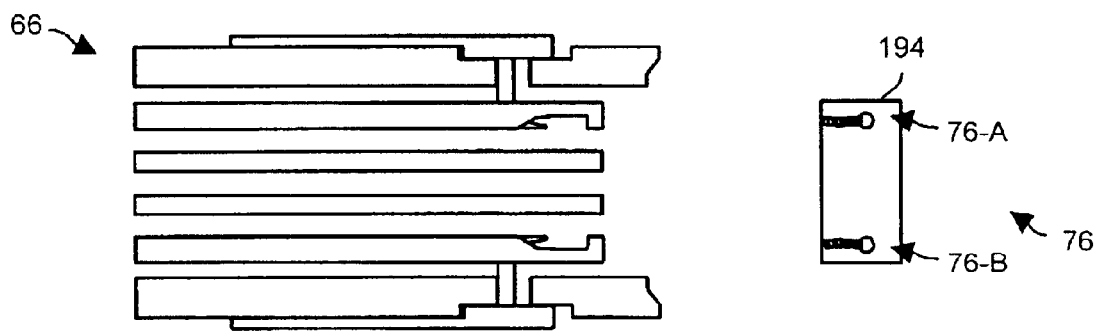
FIG. 6C is a cross-sectional view of the cleaning head prior to a reload operation which reloads the cleaning head with new swabs.

FIG. 6C shows the cleaning head 66 just prior to installation of new virgin swabs 76. As shown, the new swabs 76 can reside in a protective carrying case (or tray) 194. In particular, the new swabs 76 are disposed with a predetermined spacing and orientation for easy installation. In one arrangement, the case 194 is factory sealed until the user opens the case (e.g., peels back a tape) to use the swabs 76.

Figure 6D:
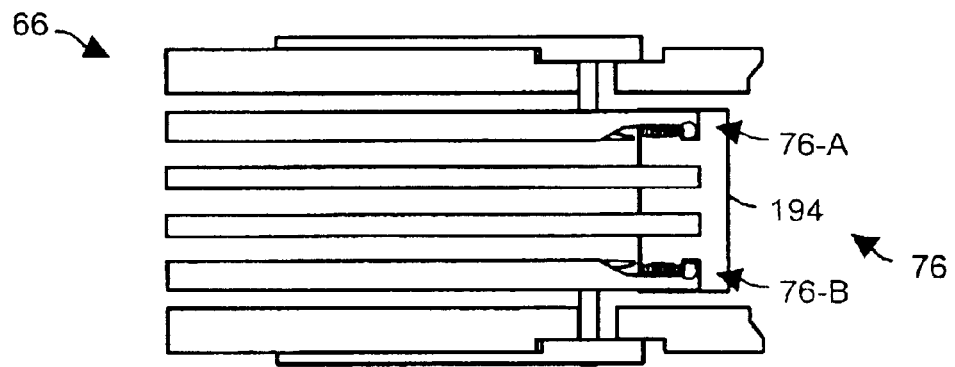
FIG. 6D is a cross-sectional view of the cleaning head during the reload operation.

FIG. 6D shows the cleaning head 66 engaged with the protective carrying case 194. Here, the actuator 98 is in the open position to enable the new swabs 76 to enter their proper positions. The cleaning head 66 locates the new swabs 76 into the loaded positions so that the swabs 76 are ready to clean a new optical connector 28. In one arrangement, the movement of the actuator 98 and the cleaning head 66 to install the new swabs 76 is under electronic control (e.g., through robotics) of the user operating the controller 48. In another arrangement, such movements are simply mechanical responses due to the user fitting the protective carrying case 194 onto the cleaning head 66.

Figure 6E:
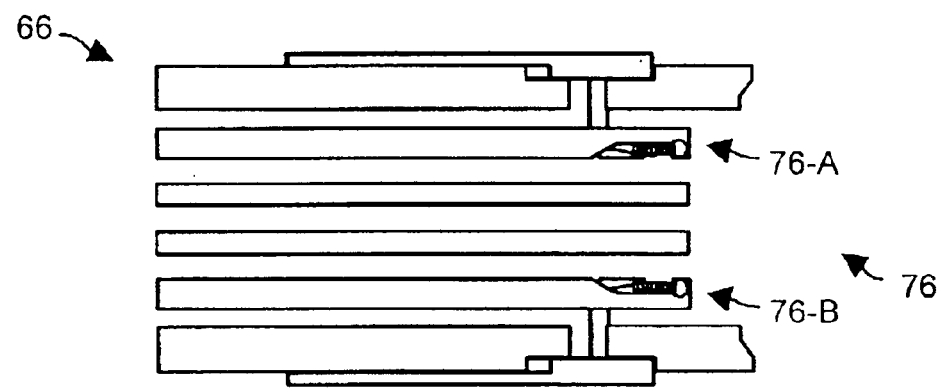
FIG. 6E is a cross-sectional view of the cleaning head after the reload operation.

FIG. 6E shows the cleaning head 66 after the new swabs 76 are properly installed and after the protective carrying case 194 is removed. At this point, the actuator 98 is moved back to its closed position to retain the ends of the swabs 76. In one arrangement, the actuator movement is controlled by the user operating the controller 48. In another arrangement, the actuator 98 moves back when the user removes the protective carrying case 194 from the cleaning head 66. Accordingly, the cleaning head 66 is now loaded and ready to perform a new cleaning operation.

As described above, the invention is directed to techniques for cleaning an optical connector 28 which involves directing fluid toward an optical interface 72 of the optical connector 28 through a cleaning head 66, and drawing the directed fluid away from the optical interface 72 of the optical connector 28 and toward the cleaning head 66. The directed fluid (e.g., a gas, gaseous snow, etc.) is well-suited for removing contaminants such as large particles, small particles (particles roughly 0.5 to 1.0 microns in size), oil and grease, etc. Additionally, since the fluid is drawn away from the optical interface 72 and toward the cleaning head 66, there is little opportunity for any contaminants carried by the fluid to fall back over the optical interface 72 and again cause contamination. Moreover, the use of environmentally safe gases (e.g., carbon dioxide, nitrogen, etc.), as the fluid, is clean and manageable. That is, the gas is easy to handle and direct over and around various parts of the connector 28 for enhanced cleaning (e.g., for cleaning any shutters 88, for cleaning around any guide pins 136, for cleaning the optical interfaces 72, etc.) without harming the user. Also, particular operations of the invention techniques can be automated to simplify and minimize manual effort by a user, as well as to ensure consistency and proper cleaning of optical connectors 28.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the cleaning assembly 32 was described above as having a shape similar to that of a circuit board 30 by way of example only. Accordingly, the cleaning assembly 32 is well-suited for cleaning optical connectors 28 which reside in back recesses of a card cage 26 as shown in FIG. 1 since the configuration of the cleaning assembly 32 alleviates the need for the user to manually reach into the card cage 26 and perform meticulous manual cleaning operations using a small handheld tool. Thus, the cleaning assembly 32 saves user time and effort, and provides a cost savings.

Figure 7:
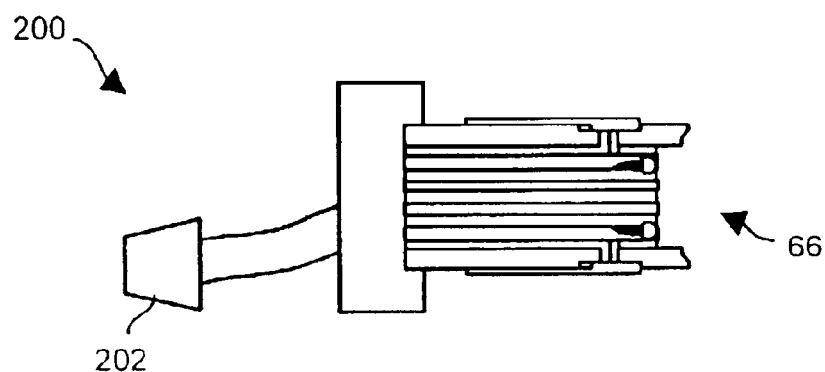
FIG. 7 is a cross-sectional view of a portion of an alternative cleaning device for the cleaning system of FIG. 1.

FIG. 7 shows a cleaning assembly 200 for cleaning optical connectors 28 which are easy to access such as optical connectors 28 on a circuit board 30. Here, the cleaning assembly 200 does not include a circuit board shaped support member 42 (see FIG. 1) making it easier for the user to maneuver the cleaning assembly 200. The cleaning assembly 200 includes a cleaning head 66 (also see FIGS. 3A through 3D), a controller (also see FIG. 1), and a connector 202 which connects to the connection media 40 (FIG. 1). The user simply pushes the cleaning assembly 200 against an optical connector 28 and operates a controller 48 (shown in FIG. 1, but not shown in FIG. 7 for simplicity) which in this situation can be remotely positioned from the cleaning head 66 (e.g., clamped to the connection media 40). Accordingly, the user can clean easily accessible optical connectors 28 (e.g., connectors 28 mounted to circuit boards 30) using the invention.

Figure 8:
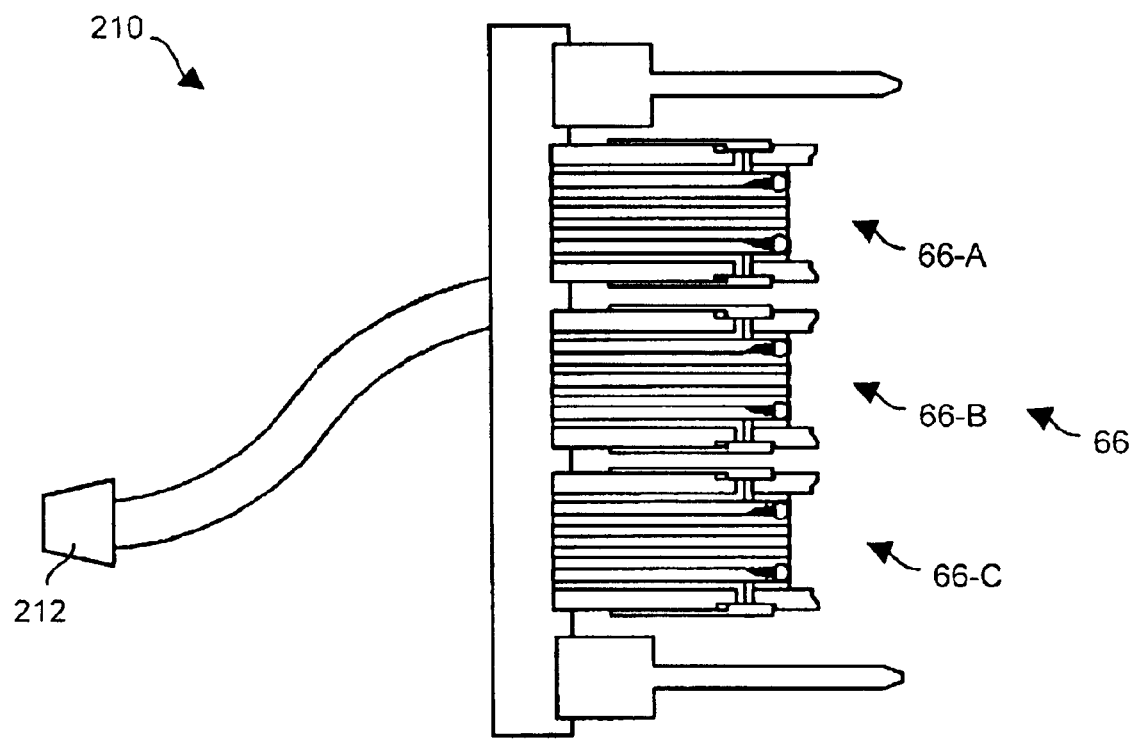
FIG. 8 is a cross-sectional view of a portion of yet another alternative cleaning device for the cleaning system of FIG. 1.

FIG. 8 shows a cleaning assembly 210 for cleaning multiple optical connectors 28 simultaneously. Again, the cleaning assembly 210 does not include a circuit board shaped support member 42 (FIG. 1) but nevertheless is well-suited for engaging and cleaning multiple optical connectors 28 at the same time. The cleaning assembly 210 includes multiple cleaning heads 66 (e.g., three cleaning heads 66-A, 66-B, 66-C), a controller 48 (also see FIG. 1), and a connector 212 which connects to the connection media 40 (FIG. 1). The positions of the cleaning heads 66 mimic the positions of the optical connectors 28 to be cleaned. Accordingly, the user saves time and can cleaning each circuit board 30 in a cost effective manner.

Additionally, it should be understood that the swabs 76 were described above as being replaced after each cleaning operation by way of example only. In other arrangements, the swabs 76 can be reloaded (e.g., pushed back into a loaded position by the carrying tray 194 of FIGS. 6C and 6D) and reused a predetermined number of times (e.g., three, 10, etc.) before being replaced.

Furthermore, it should be understood that the invention can be implemented as a portable cart which carries cleaning equipment for cleaning fiber optic assemblies 22 in the field. The cart can include a variety of cleaning assemblies 32, 200, 210 enabling the user to attach and use a suitable cleaning assembly 32, 200, 210 depending on the configuration of optical connectors 28 to be cleaned (e.g., daughter cards, circuit boards, fiber optic assemblies, etc.). Alternatively, the invention can be implemented in a stationary location (e.g., a workstation) to clean fiber optic equipment during manufacturing and prior to shipping.

Additionally, it should be understood that the multi-step operations performed by the cleaning assemblies 32, 200 and 210 can be controlled in an automated manner. For example, the controller 48 (see FIG. 1) can include an automated sequencer which runs a sequence of preprogrammed cleaning operations having predetermined amounts of cleaning times thus enabling the user to simply position the cleaning assemblies 32, 200, 210 against the optical connectors and start the controller 48. As another example, the user can be more involved in performing the steps but rely on feedback from the cleaning system 20 (e.g., audio tones, visual inspection circuitry, etc.) to guide the user from one cleaning operation to another (e.g., the user can apply the cleaning assemblies 32, 200, 210 to clean the connector peripheries until the user hears a first tone after a predetermined amount of time has elapsed and thus directing the user to perform the next step of opening shutters 88 to clean the optical interface 72, etc.).

Also, in some arrangements which use the cleaning assembly 32 (also see FIG. 1), the positions of the cleaning heads 66 on the support member 42 are adjustable to accommodate a variety of different optical connector configurations. That is, the user can change the number and positions of the cleaning heads 66 along the back edge 52 of the support member 42 to accommodate multiple connector configurations, i.e., different optical connector layouts for different backplanes 24. To this end, the set of connections 46 includes flexible manifold tubing to allow flexibility among the cleaning heads 66 (see manifolds 68, 70 in FIG. 2).

Furthermore, it should be understood that the controller 48 can include a high frequency pulse source. Such a pulse source can impart high frequency waves (i.e., momentum changes) into the fluid to assist particle dislodging.

Additionally, it should be understood that the use of the swabs 76 is optional. In some arrangements, the cleaning assemblies 32, 200, 210 include other enhanced cleaning mechanisms other than swabs 76 such as rotating wheels, disks, brushes, squeegees, etc. which can be driven by the fluid flow. In some arrangements, the cleaning assemblies 32, 200, 210 use adhesive material (rather than swabs) that contacts/presses against the optical interfaces to capture contaminates. In some arrangements (e.g. when the cleaning fluid is $CO_2$ snow), no additional cleaning mechanism is required at all.

Furthermore, it should be understood that the cleaning system 20 applied fluid by way of example only. In some arrangements, the cleaning system also applied solids with the fluid (e.g., $CO_2$ snow). Other combinations are suitable for use as well such as liquid solvents, liquids which suspend a solid abrasive, etc.

Moreover, it should be understood that the cleaning system 20 can be combined with other equipment as well. For example, the cleaning system 20 can be combined with visual inspection equipment (e.g., a high-powered camera) for inspecting the optical interfaces 72 before and/or after cleaning for problem identification and analysis. In such configurations, the cleaning system 20 can share resources with the other equipment such as space on a portable cart, power supplies, etc.

Furthermore, it should be understood that the fluid application and withdrawal mechanisms described above are optional in certain arrangements. In some arrangements, the cleaning assemblies 32, 200, 210 are configured to clean a set of optical connectors 28 (i.e., one or more optical connectors 28) using swabs in response to, or shortly after, insertion of a support member into the fiber optic assembly 22 (see FIG. 1) in an automated manner. In these arrangements, the cleaning assemblies 32, 200, 210 include a support member 42 which defines a cleaning device edge 52, and a set of cleaning devices 44 disposed along the cleaning device edge 52 of the support member 42 (see FIG. 1). Each cleaning device 44 includes a set of swabs 76 such that, when the support member 42 installs into a circuit board location of the fiber optic assembly 22, the set of swabs 76 of that cleaning device 44 aligns and cleans a corresponding fiber optic connector 28 of the fiber optic assembly 22. In one arrangement, the cleaning assemblies 32, 200, 210 further include a set of actuators 98 which is configured to move (e.g., release, proactively push, etc.) the set of swabs 76 of each cleaning device 44 from a loaded position (see FIG. 4A) in which no contact is made with the corresponding fiber optic connector 28 to a cleaning position in which contact is made with the corresponding fiber optic connector 28 (see FIGS. 4B through 4D). In one arrangement, the set of actuators 98 actuate in response to insertion of the support member 42 into the card cage and against the backplane 24. In another arrangement, the user moves a control on the controller 48 to actuate the set of actuators 98. In one arrangement, the set of swabs 76 of each cleaning device 44 includes adhesive material in order to mechanically capture contaminants over the optical interface of the corresponding optical connector 28 (i.e., dirt particles, dust, grease, oil films, etc.). Such modifications and enhancements are intended to be included in particular arrangements of the invention.

What is claimed is:

1. A system for cleaning a set of optical connectors, the system comprising:
    a fluid source;
    a vacuum source;
    a support member which defines a cleaning device edge; and
    a set of cleaning devices, each cleaning device including (i) a fluid intake member which connects to the fluid source, (ii) a fluid output member which connects to the vacuum source, and (iii) a cleaning head which connects to the fluid intake member and the fluid output member, each cleaning device being disposed along the cleaning device edge of the support member, the set of cleaning devices being configured to:
        align over a set of optical interfaces of the set of optical connectors,
        direct fluid from the fluid source toward the set of optical interfaces, and
        draw the directed fluid away from the set of optical interfaces and toward the vacuum source.

2. A cleaning assembly for cleaning an optical connector having an optical interface, the cleaning assembly comprising:
    a fluid intake member;
    a fluid output member; and
    a cleaning head coupled to the fluid intake member and the fluid output member, the cleaning head being configured to:
        align over the optical interface of the optical connector;
        direct fluid from the fluid intake member toward the optical interface of the optical connector when the fluid intake member connects to a fluid source; and
        draw the directed fluid away from the optical interface of the optical connector and toward the fluid output member when the fluid output member connects to a fluid drawing device wherein the cleaning head includes at least one swab.

3. The cleaning assembly of claim 2 wherein the fluid includes gas, and wherein the cleaning head includes a nozzle which is configured to eject the gas toward the optical interface of the optical connector.

4. The cleaning assembly of claim 2 wherein the fluid includes gas, and wherein the cleaning assembly further comprises:
   a high frequency pulse source coupled to the cleaning head, the high frequency pulse source being configured to place high frequency pulses into the gas when the cleaning head directs the fluid from the fluid intake member toward the optical interface of the optical connector.

5. The cleaning assembly of claim 2 wherein the cleaning head includes a nozzle which is configured to spray the fluid and snow toward the optical interface of the optical connector.

6. The cleaning assembly of claim 2 wherein the fluid includes gas, and wherein the cleaning head includes a nozzle which defines multiple ducts such that the gas outputs toward the optical interface of the optical connector through the multiple ducts defined by the nozzle when the fluid intake member connects to the fluid source.

7. The cleaning assembly of claim 2 wherein the optical connector further has a set of optical interface shutters; and wherein the cleaning head is further configured to, prior to directing the fluid toward the optical interface of the optical connector:
   dispense the fluid over the set of optical interface shutters; and
   actuate the optical connector such that the set of optical interface shutters moves to expose the optical interface.

8. The cleaning assembly of claim 7 wherein the fluid output member is configured to connect to a vacuum device as the fluid drawing device, and wherein the cleaning head is configured to:
   apply a vacuum from the vacuum device over the set of optical interface shutters when the fluid output member connects to the vacuum device and while the cleaning head dispenses the fluid.

9. The cleaning assembly of claim 2 wherein the cleaning head includes:
   a set of swabs; and
   an actuator which is configured to (i) hold each swab in place prior to actuation, and (ii) release a portion of each swab when actuated to cause that portion to contact the optical interface of the optical connector.

10. The cleaning assembly of claim 9 wherein the cleaning head further includes a nozzle which is configured to direct the fluid such that the fluid pushes the portion of each swab onto the optical interface of the optical connector when the actuator is actuated.

11. The cleaning assembly of claim 9 wherein the cleaning head further includes a mechanical actuator which is configured to press the swab against a surface of the optical interface of the optical connector.

12. The cleaning assembly of claim 9 wherein the swab includes an adhesive material.

13. The cleaning assembly of claim 12, further comprising:
   another cleaning head having another fluid intake member and another fluid output member, the other cleaning head being attached to the support member along the particular edge of the support member, and the other cleaning head being configured to:
      align over an optical interface of another optical connector;
      direct fluid from the fluid intake member toward the optical interface of the other optical connector when the other fluid intake member connects to the fluid source; and
      draw the directed fluid away from the optical interface of the other optical connector when the other fluid output member connects to the fluid drawing device.

14. The cleaning assembly of claim 2 wherein the fluid output member is configured to connect to a vacuum device as the fluid drawing device, and wherein the cleaning head is configured to:
   apply a vacuum from the vacuum device over the optical interface of the connector when the fluid output member connects to the vacuum device and while the cleaning head directs the fluid toward the optical interface.

15. The cleaning assembly of claim 2 wherein a circuit board card cage is disposed in a fixed position relative to the optical connector, and wherein the cleaning assembly further comprises:
   a support member which is configured to engage the circuit board card cage, the cleaning head being attached to the support member along a particular edge of the support member.

16. A system for cleaning a set of optical connectors, the system comprising:
   a fluid source;
   a support member which defines a cleaning device edge; and
   at least one cleaning device, each cleaning device residing along the cleaning device edge defined by the support member and including (i) an input member which connects to the fluid source, and (ii) a cleaning head, the cleaning head of each cleaning device being configured to:
      align with an optical interface of a corresponding optical connector of the set of optical connectors and direct fluid from the input member of that cleaning device toward the optical interface wherein the cleaning head includes at least one swab.

17. A system for cleaning a set of optical connectors, the system comprising:
   a fluid source;
   a vacuum source;
   a support member which defines a cleaning device edge; and
   at least one cleaning device, each cleaning device residing along the cleaning device edge defined by the support member and including (i) an input member which connects to the fluid source, and (ii) a cleaning head, and (iii) an output member for evacuating fluid from the cleaning head, the cleaning head of each cleaning device being configured to:
      align with an optical interface of a corresponding optical connector of the set of optical connectors, direct fluid from the input member of that cleaning device toward the optical interface, and remove particulated fluid from the optical interface through the output member of that cleaning device wherein the cleaning head includes at least one swab.

18. A cleaning assembly for cleaning a set of optical connectors, the cleaning assembly comprising:
   a support member which defines a cleaning device edge; and
   a set of cleaning devices disposed along the cleaning device edge of the support member, each cleaning device including a set of swabs such that, when the support member installs into a circuit board location of a fiber optic assembly, the set of swabs of that cleaning device aligns and cleans a corresponding fiber optic connector of the fiber optic assembly.

19. The cleaning assembly of claim 18, further comprising:

a set of actuators which is configured to move the set of swabs of each cleaning device from a loaded position in which no contact is made with the corresponding fiber optic connector to a cleaning position in which contact is made with the corresponding fiber optic connector.

20. The cleaning assembly of claim 18 wherein the set of swabs of each cleaning device includes adhesive material.

* * * * *